United States Patent
Osada

(10) Patent No.: US 8,339,096 B2
(45) Date of Patent: Dec. 25, 2012

(54) WIRELESS POWER RECEIVING DEVICE

(75) Inventor: Takeshi Osada, Isehara (JP)

(73) Assignee: Semiconductor Energy Laboratory Co., Ltd., Atsugi-shi, Kanagawa-ken (JP)

(*) Notice: Subject to any disclaimer, the term of this patent is extended or adjusted under 35 U.S.C. 154(b) by 951 days.

(21) Appl. No.: 11/979,994

(22) Filed: Nov. 13, 2007

(65) Prior Publication Data

US 2009/0308933 A1  Dec. 17, 2009

(30) Foreign Application Priority Data

Nov. 20, 2006  (JP) ................................. 2006-312680

(51) Int. Cl.
  *H02J 7/00* (2006.01)
  *H01F 17/00* (2006.01)
  *H01Q 1/24* (2006.01)
  *H04L 1/02* (2006.01)
  *H01F 37/00* (2006.01)

(52) U.S. Cl. ........ 320/108; 307/104; 343/702; 370/339; 375/267; 455/437; 379/443

(58) Field of Classification Search .................. 307/104; 343/702; 370/339; 375/267; 455/437; 379/443; 320/108
  See application file for complete search history.

(56) References Cited

U.S. PATENT DOCUMENTS

| | | | |
|---|---|---|---|
| 5,748,669 A * | 5/1998 | Yada | 375/135 |
| 6,032,546 A * | 3/2000 | Stone | 74/5.7 |
| 6,535,167 B2 * | 3/2003 | Masuda et al. | 343/700 MS |
| 6,636,181 B2 | 10/2003 | Asano et al. | |
| 6,803,744 B1 * | 10/2004 | Sabo | 320/108 |
| 6,930,408 B2 * | 8/2005 | Yang | 307/104 |
| 7,109,682 B2 * | 9/2006 | Takagi et al. | 320/108 |
| 7,483,727 B2 * | 1/2009 | Zhu et al. | 455/575.5 |
| 7,515,033 B2 | 4/2009 | Roosli et al. | |

(Continued)

FOREIGN PATENT DOCUMENTS

JP  03-113943  11/1991

(Continued)

OTHER PUBLICATIONS

The history of power transmission by radio waves, William C. Brown, Sep. 1984, IEE vol. MTT-32, No. 9, pp. 1230-1232.*

(Continued)

*Primary Examiner* — Patrick Assouad
*Assistant Examiner* — Steve T Chung
(74) *Attorney, Agent, or Firm* — Eric J. Robinson; Robinson Intellectual Property Law Office, P.C.

(57) ABSTRACT

To provide a wireless power receiving device and an electronic device having the wireless power receiving device whose production costs do not increase even when frequency of electromagnetic waves received for power supply varies. Further, to provide a wireless power receiving device capable of power transmission without disconnection or poor connection when a load supplied with electricity and a battery connected to an antenna are manufactured in different steps. A power transmitter and receiver portion having first and second antenna circuits and a battery portion and a load portion having a third antenna circuit are provided to charge a battery of the battery portion with a first radio signal received at the first antenna circuit and transmit electricity stored in the battery portion as a second radio signal from the second antenna circuit to the third antenna circuit so that the third antenna circuit supplies electricity to the load.

33 Claims, 19 Drawing Sheets

U.S. PATENT DOCUMENTS

| | | | |
|---|---|---|---|
| 7,522,878 B2 * | 4/2009 | Baarman | 455/41.1 |
| 7,548,151 B2 | 6/2009 | Roosli et al. | |
| 7,863,859 B2 * | 1/2011 | Soar | 320/108 |
| 7,953,369 B2 | 5/2011 | Baarman | |
| 8,099,140 B2 * | 1/2012 | Arai | 455/573 |
| 8,116,681 B2 | 2/2012 | Baarman | |
| 8,116,683 B2 | 2/2012 | Baarman | |
| 2002/0017979 A1 * | 2/2002 | Krause et al. | 340/10.1 |
| 2002/0122499 A1 * | 9/2002 | Kannan et al. | 375/260 |
| 2005/0134213 A1 * | 6/2005 | Takagi et al. | 320/108 |
| 2006/0113955 A1 * | 6/2006 | Nunally | 320/108 |
| 2006/0164205 A1 | 7/2006 | Buckingham et al. | |
| 2006/0164206 A1 | 7/2006 | Buckingham et al. | |
| 2009/0033564 A1 * | 2/2009 | Cook et al. | 343/702 |
| 2009/0067198 A1 * | 3/2009 | Graham et al. | 363/8 |
| 2010/0164458 A1 * | 7/2010 | Pollard | 323/284 |
| 2011/0177783 A1 | 7/2011 | Baarman | |
| 2011/0189954 A1 | 8/2011 | Baarman | |
| 2011/0269399 A1 | 11/2011 | Baarman | |
| 2011/0273026 A1 | 11/2011 | Baarman | |
| 2011/0275319 A1 | 11/2011 | Baarman | |
| 2011/0298298 A1 | 12/2011 | Baarman | |
| 2012/0043827 A1 | 2/2012 | Baarman | |
| 2012/0075064 A1 | 3/2012 | Buckingham et al. | |

FOREIGN PATENT DOCUMENTS

| | | |
|---|---|---|
| JP | 03-113943 U | 11/1991 |
| JP | 09-026834 A | 1/1997 |
| JP | 09-128110 A | 5/1997 |
| JP | 09-240811 A | 9/1997 |
| JP | 2000-224082 A | 8/2000 |
| JP | 2001-264432 A | 9/2001 |
| JP | 2002-217800 A | 8/2002 |
| JP | 2003-006592 | 1/2003 |
| JP | 2003-299255 | 10/2003 |
| JP | 2005-073350 A | 3/2005 |
| JP | 2005-143181 A | 6/2005 |
| JP | 2006-138162 A | 6/2006 |
| JP | 2006-517778 | 7/2006 |
| JP | 2006-217393 A | 8/2006 |
| JP | 2008-533340 | 8/2008 |
| WO | WO-2004/073166 | 8/2004 |
| WO | WO-2006/101614 | 9/2006 |
| WO | WO-2006/101615 | 9/2006 |
| WO | WO-2008/121181 | 10/2008 |

OTHER PUBLICATIONS

The history of power transmission by radio waves, William C. Brown, Sep. 1984, IEEE vol. MTT-32, No. 9, pp. 1230-1232.*

The StarTAC Catalog published by Motorola Mar. 18, 1999, (LIT 1227 Mar. 1999 6809423A23) pp. cover page and 12.*

* cited by examiner

WIRELESS POWER RECEIVING DEVICE

BACKGROUND OF THE INVENTION

1. Field of the Invention

The present invention relates to a wireless power receiving device into which electricity is supplied wirelessly.

2. Description of the Related Art

Since a variety of electronic devices became widespread, many kinds of products have been shipped to market. In recent years, particularly, portable electronic devices for outdoor use have been remarkably widespread.

As an example of a portable electronic device for outdoor use, an RFID (radio frequency identification) tag (hereinafter referred to as an RF tag) has been actively researched and developed for practical use. The RF tag may be classified into two types: an active RF tag and a passive RF tag. On the other hand, other than the active RF tag and the passive RF tag, another type of an RF tag including a battery which is charged by using electromagnetic waves of a cell phone or the like in order to acquire electricity to drive the RF tag, has been developed. (Reference 1: Japanese Published Patent Application No. 2003-6592)

Note that an RF tag is also referred to as an IC (integrated circuit) tag, an IC chip, an RF chip, a wireless tag, and an electronic tag.

Note that charging a battery by using radio signals of electromagnetic waves is not only for an RF tag. Research and development on an electric energy feeder dedicated to charge a battery of a portable electronic device have also been actively conducted. (Reference 2: Japanese Published Patent Application No. 2003-299255)

SUMMARY OF THE INVENTION

However, the shape of an antenna which receives electromagnetic waves supplied to charge a battery of a portable electronic device should be determined based on every frequency of the electromagnetic waves received. Therefore, the shape of the antenna needs to be changed every time the frequency of the electromagnetic waves varies. Since replacement of antennas in a manufacturing step increases production costs, low-cost production has been an object to be achieved.

Moreover, in the case where the battery of the portable electronic device which accumulates electricity acquired upon reception of electromagnetic waves at the antenna is larger than a load to be supplied with electricity, it is hard to form the battery and the load supplied with electricity in the same manufacturing step. However, in the case where the load supplied with electricity and the battery connected to the antenna are formed in the different steps and are connected with a penetration electrode, a wire bonding, or the like to perform power transmission between them, defects such as disconnection, poor connection, and the like may occur.

An object of the present invention is to provide a wireless power receiving device without increase in production costs even when the frequency of electromagnetic waves which are received for power supply varies. Further, it is also another object of the present invention to provide a wireless power receiving device in which power transmission between a load and a battery connected to an antenna may be conducted without disconnections, poor connections, and the like after each of two is formed in a different step.

In order to solve the above problems, a wireless power receiving device of the invention includes a power transmitter and receiver portion with a first antenna circuit, a second antenna circuit, and a battery potion, and a load portion with a third antenna circuit. In the wireless power receiving device of the invention, a battery of the battery portion is charged by using a first radio (wireless) signal received at the first antenna circuit. Electricity stored in the battery portion is transmitted as a second radio (wireless) signal from the second antenna circuit to the third antenna circuit. The third antenna circuit receives the second radio (wireless) signal so that the load is supplied with electricity.

A wireless power receiving device of the invention according to one aspect of the invention includes the following: a power transmitter and receiver portion having a first antenna circuit configured to receive a first radio (wireless) signal, a battery portion configured to store electricity upon reception of the first radio (wireless) signal at the first antenna circuit, and a second antenna circuit configured to transmit electricity stored in the battery portion as a second radio (wireless) signal; and a load portion having a third antenna circuit configured to receive the second radio (wireless) signal and a load to be supplied with the second radio (wireless) signal received at the third antenna circuit.

A wireless power receiving device according to another aspect of the invention includes the following: a power transmitter and receiver portion having a first antenna circuit configured to receive a communication signal, a battery portion configured to be charged with electricity generated upon reception of the communication signal at the first antenna circuit, a signal transmitter and receiver portion configured to amplify an amplitude of the communication signal by using the electricity of the battery portion, and a second antenna circuit configured to transmit the communication signal amplified in the signal transmitter and receiver portion as a radio (wireless) signal; and a load portion having a third antenna circuit configured to receive the radio (wireless) signal, a rectifier circuit configured to be supplied with the radio (wireless) signal received at the third antenna circuit, a power supply circuit configured to generate electricity by using an output signal from the rectifier circuit, and a signal processing circuit configured to be supplied with the radio (wireless) signal received at the third antenna circuit and electricity from the power supply circuit.

The battery portion of the invention may include a rectifier circuit, a charging control circuit, a battery, and a discharging control circuit. The charging control circuit is configured to control the charging of the battery with electricity which is generated upon input of the first radio (wireless) signal to the rectifier circuit. The discharging control circuit controls discharging of electricity stored in the second antenna circuit.

Antennas of the first antenna circuit and the second antenna circuit of the invention may be different in shapes.

The battery of the invention may be a secondary battery or a capacitor.

The secondary battery of the invention may be a lithium battery, a lithium polymer battery, a lithium ion battery, a nickel-hydrogen battery, a nickel-cadmium battery, an organic radical battery, a lead-acid storage battery, an air secondary battery, a nickel zinc battery, or a silver zinc battery.

The capacitor of the invention may be an electric double layer capacitor.

The first radio (wireless) signal of the invention may be a commercial radio wave in exterior space.

The first radio (wireless) signal of the invention may be an electromagnetic wave transmitted from a feeder.

The second antenna circuit of the invention may be configured to transmit the second radio (wireless) signal to the third antenna circuit by an electromagnetic coupling method or an electromagnetic induction method.

The first antenna circuit of the invention may include a plurality of antennas which may be different in shapes.

The second antenna circuit of the invention may include an amplifier configured to amplify an amplitude of the second radio (wireless) signal by using electricity supplied from the battery portion.

The second antenna circuit of the invention may include an oscillator configured to control a frequency of the second radio (wireless) signal.

The load of the invention may be an RF tag including a rectifier circuit, a power supply circuit, a signal processing circuit, and a fourth antenna circuit. A signal received at the fourth antenna circuit is processed in the signal processing circuit. For driving the signal processing circuit, electricity may be generated from the second radio (wireless) signal input from the third antenna circuit to the power supply circuit through the rectifier circuit.

The load portion of the invention may include a load connected to the third antenna circuit and the load may be an electronic device configured to be driven with intermittent power supply.

By using the structure of the wireless power receiving device of the invention, the power transmitter and receiver portion and the load portion may be easily removed. Accordingly, every time the frequency of the electromagnetic waves received at the first antenna circuit changes, the shape of the antenna may be adjusted by merely changing the power transmitter and receiver portion having the first antenna circuit. Therefore, the wireless power receiving device of the invention may be produced at low cost by reducing production cost for replacing the first antenna.

Moreover, in the present invention, the battery portion including the battery which accumulates electricity supplied through the electromagnetic waves and the antenna which receives the electromagnetic waves, and the load portion including the load supplied with electricity are formed separately so that the load portion is supplied with electricity through the radio (wireless) signal. Therefore, electricity may be transmitted from the battery portion which accumulates electricity supplied through the electromagnetic waves, to the load portion supplied with electricity without using a penetration electrode or a wire bonding or the like. Accordingly, defects such as disconnection or poor connection may be reduced.

DETAILED DESCRIPTION OF THE INVENTION

Figure 1:
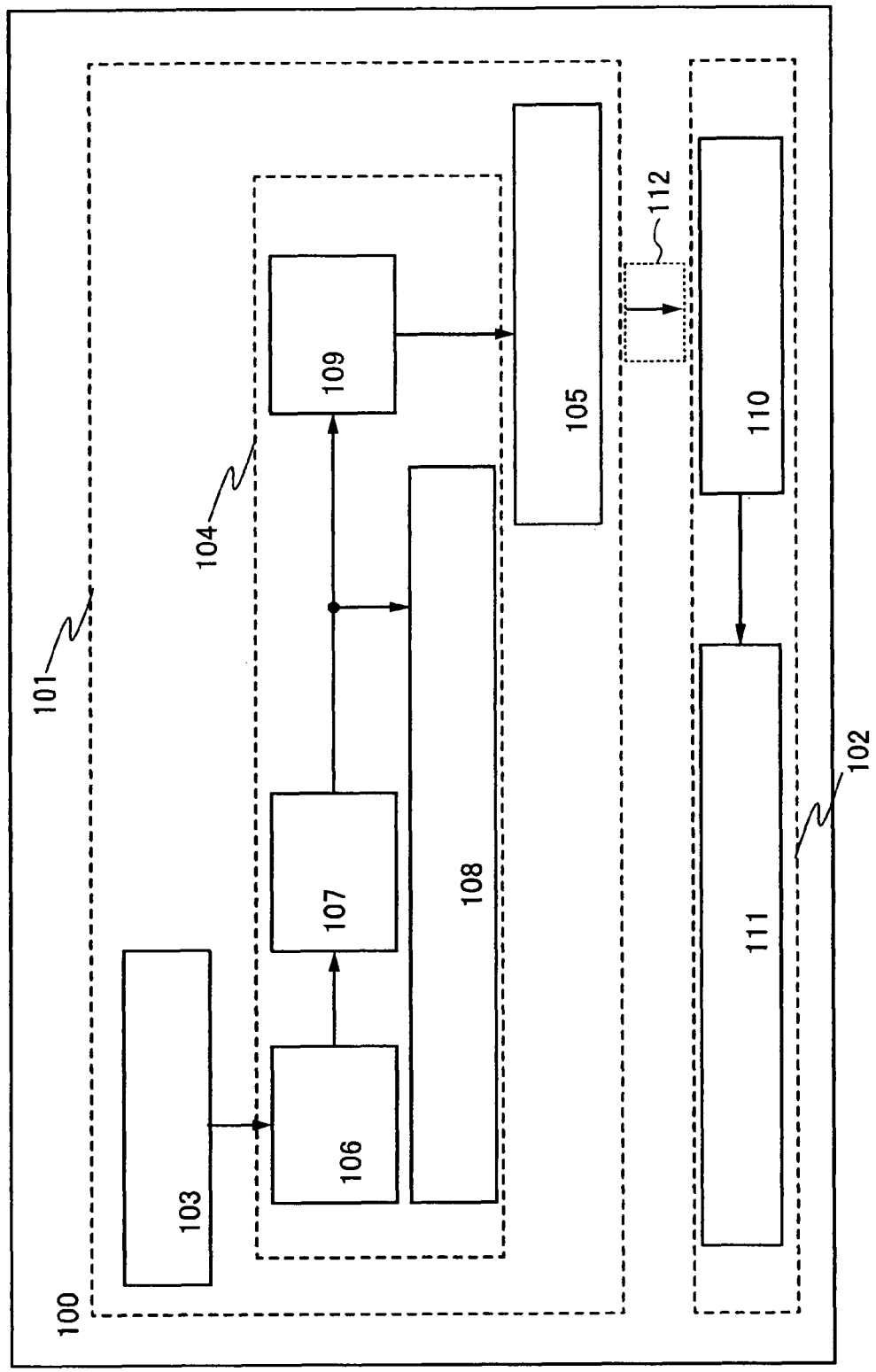
FIG. 1 is a diagram showing a structure of Embodiment Mode 1.

Hereinafter, embodiment modes of the present invention will be described with reference to the accompanying drawings. However, the invention may be implemented by various different ways and it will be easily understood by those skilled in the art that various changes and modifications are possible. Therefore, the present invention should not be interpreted as being limited to the description of the embodiment modes. Note that identical portions or portions having the same function in all drawings illustrating the structure of the invention that are described below are denoted by the same reference numerals.

Embodiment Mode 1

This embodiment mode will describe an example of a wireless power receiving device of the present invention with reference to drawings.

A wireless power receiving device 100 shown in this embodiment mode includes a power transmitter and receiver portion 101 and a load portion 102. The power transmitter and receiver portion 101 includes a first antenna circuit 103, a battery portion 104, and a second antenna circuit 105. The battery portion 104 includes a rectifier circuit 106, a charging control circuit 107, a battery 108, and a discharging control circuit 109. In addition, the load portion 102 includes a third antenna circuit 110 and a load 111.

Figure 2:
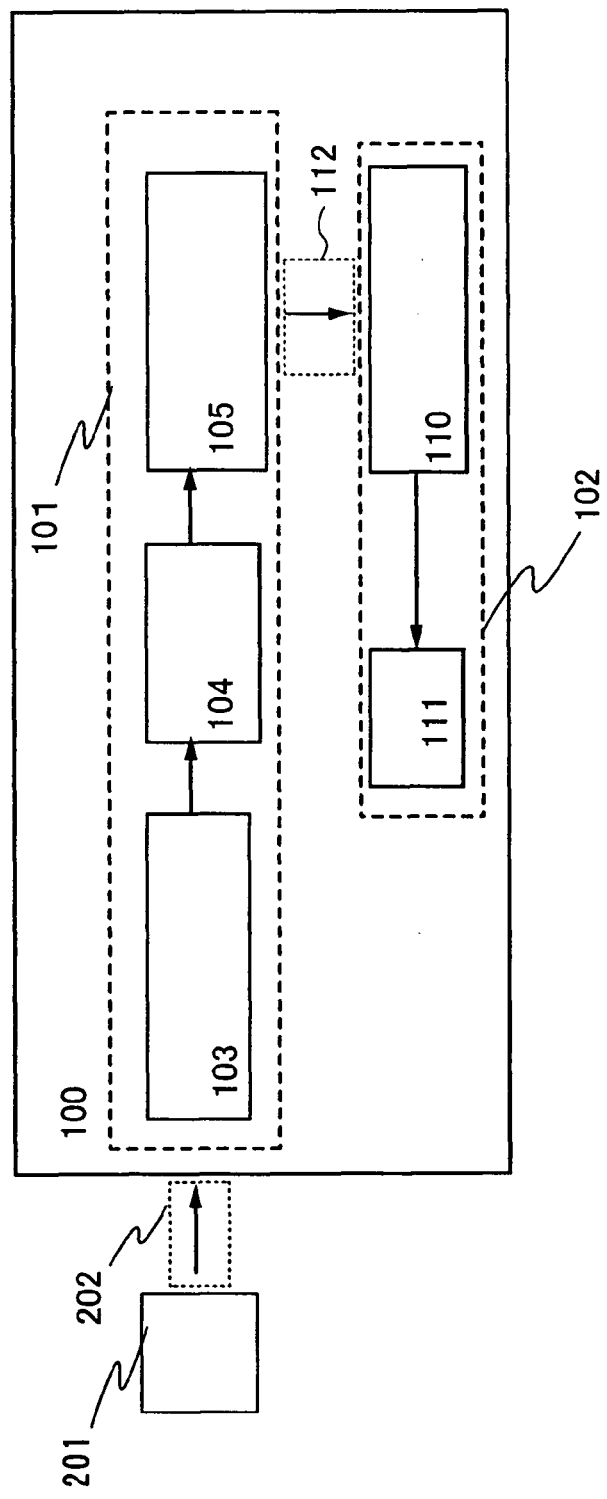
FIG. 2 is a diagram showing a structure of Embodiment Mode 1.

Note that in the wireless power receiving device 100 shown in FIG. 1, electromagnetic waves 202 are transmitted to the first antenna circuit 103 in the power transmitter and receiver portion 101, by an electromagnetic wave feeder 201 provided outside of the wireless power receiving device 100 as shown in FIG. 2. The electromagnetic wave feeder in this embodiment mode may be a feeder which transmits an electromagnetic wave with a specific wavelength, or may employ electromagnetic waves used as commercial radio waves. Any device may be used as a feed as long as it can transmit electromagnetic waves with a specific wavelength. In addition, it is preferable to use a feeder which transmits electromagnetic waves with such wavelength that the first antenna circuit 103 of the wireless power receiving device 100 easily receives. Examples of the electromagnetic waves in exterior space include the following: electromagnetic waves of the repeater station of cell phones (a band of 800 to 900 MHz, a band of 1.5 GHz, 1.9 to 2.1 GHz, or the like); electromagnetic waves emitted from cell phones; electromagnetic waves emitted from radio time signals, and noise of AC power supply for domestic use.

Note that in this specification, the electromagnetic waves received at the first antenna circuit 103 from the electromagnetic wave feeder are hereinafter referred to as first radio (wireless) signals. In the case where the electromagnetic waves from the feeder are used as the first radio (wireless) signals, electricity may be transmitted wirelessly using the electromagnetic waves with a specific wavelength so that electricity is transmitted efficiently. On the other hand, in the case where commercial radio waves in exterior space are used as the first radio (wireless) signals, the wireless power supply may be performed even outside as long as the antenna is within the range of the commercial radio waves.

In the case where a feeder is used as the electromagnetic wave feeder 201 shown in FIG. 2, a transmission method of the first radio (wireless) signals across the first antenna circuit 103 and the feeder may be an electromagnetic coupling method, an electromagnetic induction method, a micro-wave method, or the like. A transmission method may be sorted as appropriate by a practitioner in consideration of usage of the device, and an antenna with an optimum shape and length may be provided in accordance with an adopted transmission method.

Figure 3:
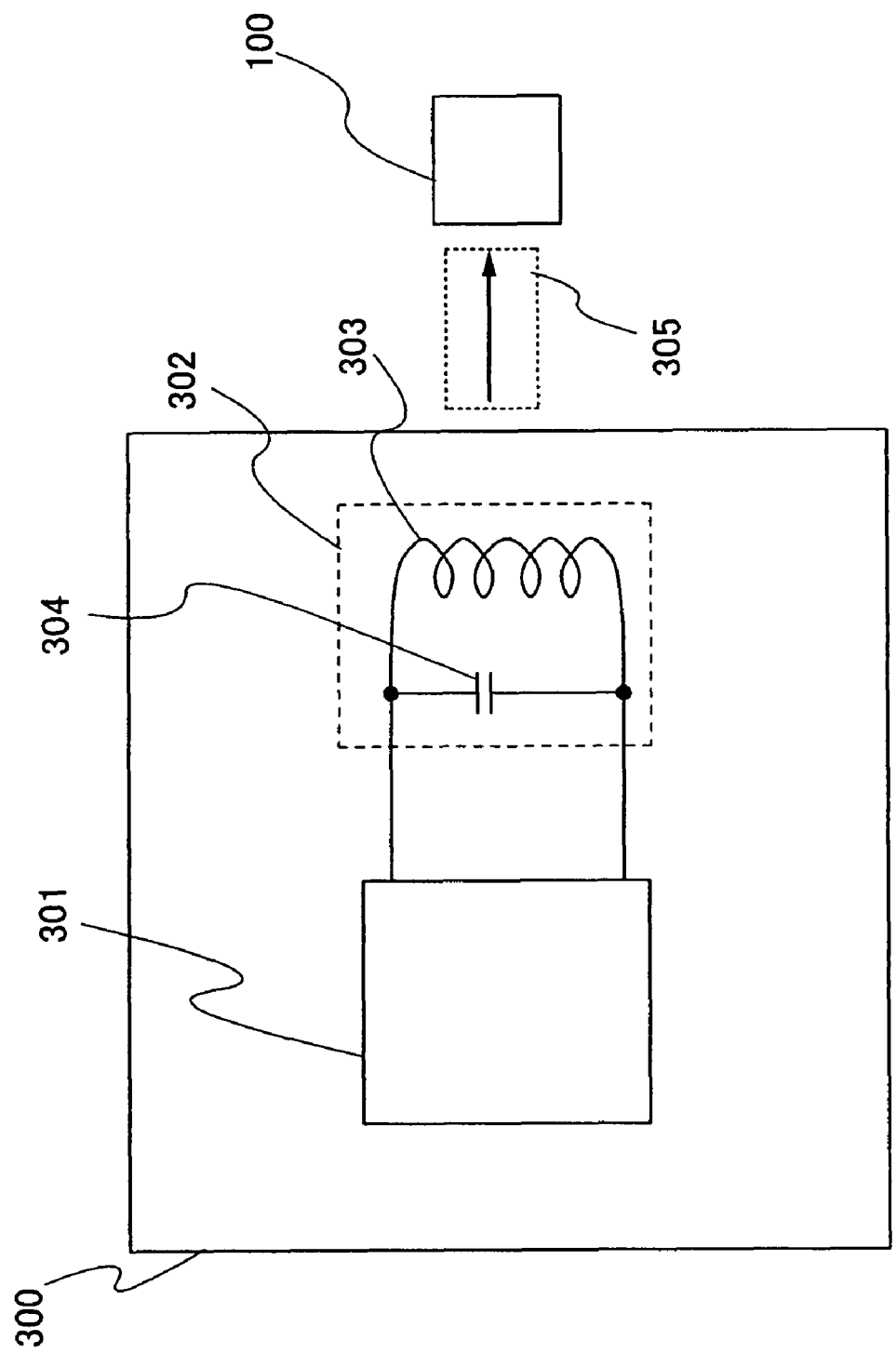
FIG. 3 is a diagram showing a structure of Embodiment Mode 1.

Moreover, FIG. 3 illustrates the construction of a feeder in the case where the feeder is used as the electromagnetic wave feeder 201 in FIG. 2. A feeder 300 may be constructed with a power transmission controller 301 and an antenna circuit 302. The power transmission controller 301 modulates electric signals for power transmission to the wireless power receiving device 100, and outputs a first radio (wireless) signal 305 for power transmission from the antenna circuit 302. In this embodiment mode, as an example, the antenna circuit 302 of the feeder 300 shown in FIG. 3 is connected to the power transmission controller 301 and includes an antenna 303 and a resonance capacitor 304 which form an LC parallel resonance circuit. The power transmission controller 301 supplies an induced current to the antenna circuit 302 when transmitting power, and outputs the first radio (wireless) signal 305 for power transmission to the wireless power receiving device 100 from the antenna 303.

Further, in the case where a feeder is used as an electromagnetic wave feeder, the frequency of the first radio (wireless) signal 305 which is transmitted from the feeder to the first antenna circuit 103 in the wireless power receiving device 100 is not limited to a specific value. For example, any of the following may be employed: a sub millimeter wave of greater than or equal to 300 GHz and less than or equal to 3 THz; an extra high frequency of greater than or equal to 30 GHz and less than or equal to 300 GHz; a super high frequency of greater than or equal to 3 GHz and less than or equal to 30 GHz; an ultra high frequency of greater than or equal to 300 MHz and less than or equal to 3 GHz; a very high frequency of greater than or equal to 30 MHz and less than or equal to 300 MHz; a high frequency of greater than or equal to 3 MHz and less than or equal to 30 MHz; a medium frequency of greater than or equal to 300 kHz and less than or equal to 3 MHz; a low frequency of greater than or equal to 30 kHz and less than or equal to 300 kHz; and a very low frequency of greater than or equal to 3 kHz and less than or equal to 30 kHz.

Figure 4A:
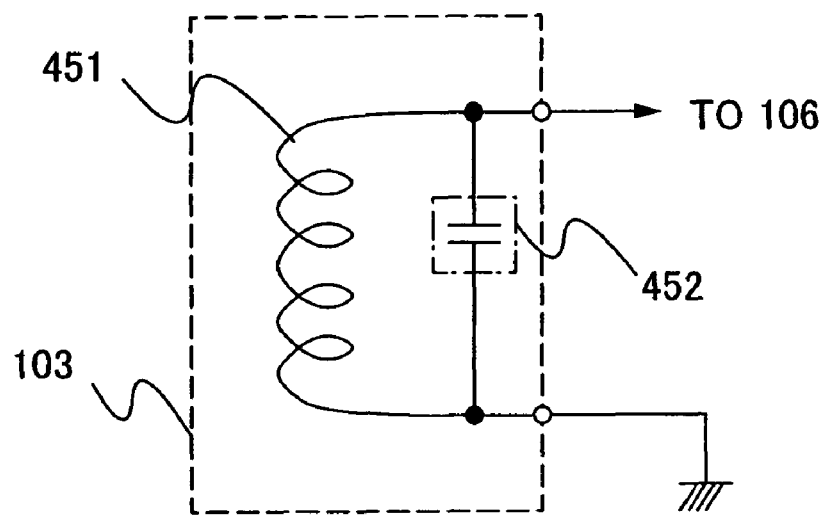
FIGS. 4A and 4B are diagrams showing structures of Embodiment Mode 1.

FIG. 1 will be described again. FIG. 4A illustrates an exemplary structure of the first antenna circuit 103 in the power transmitter/receiver portion 101 which receives the first radio (wireless) signal from the electromagnetic wave feeder in FIG. 1. In FIG. 4A, the first antenna circuit 103 may be formed with an antenna 451 and a resonance capacitor 452. Note that in this specification, the antenna 451 and the resonance capacitor 452 are collectively referred to as the first antenna circuit 103.

Figure 8A:
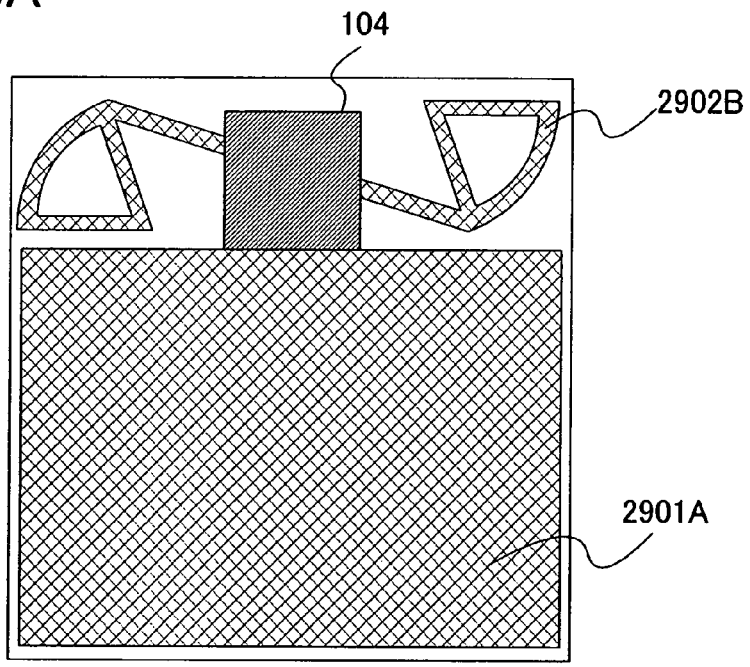
FIGS. 8A and 8B are diagrams showing structures of Embodiment Mode 1.
Figure 8B:
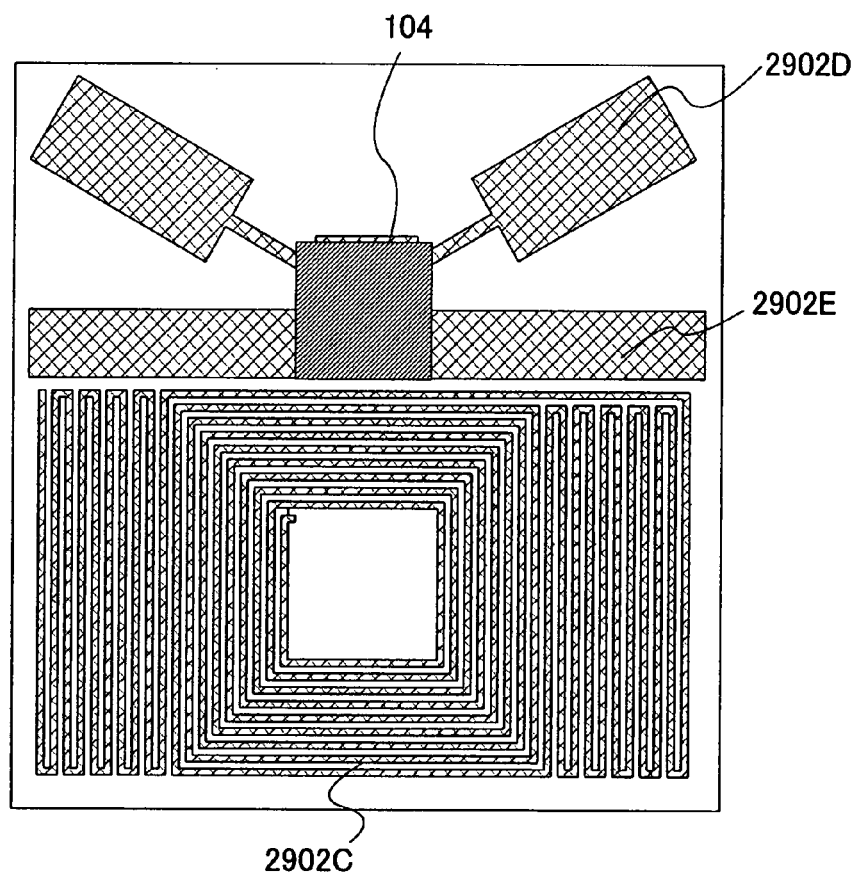

Note that antennas which differ from each other in shapes may be combined together so that an antenna which can receive the first radio (wireless) signals having a plurality of frequency bands is employed as the first antenna circuit 103 in the wireless power receiving device 100 of the invention. FIGS. 8A and 8B illustrate exemplary forms of the antennas. A structure shown in FIG. 8A may be employed in which an antenna 2902A and a 180° omni-directional antenna 2902B (capable of receiving signals equally from any directions) are disposed all around the battery portion 104 having the battery 108 and the like. Further, as shown in FIG. 8B, a structure may be employed in which a thin coiled antenna 2902C, an antenna 2902D which receives first radio (wireless) signals with a high frequency, and an antenna 2902E extended in a stick shape is disposed around the battery portion 104 having the battery 108 and the like. As shown in FIGS. 8A and 8B, combining antennas with a plurality of shapes allows fabrication of a wireless power receiving device which can receive an electromagnetic wave with a plurality of frequency bands (for example, the first radio (wireless) signal from the feeder and electromagnetic waves that are generated randomly outside).

Figure 4B:
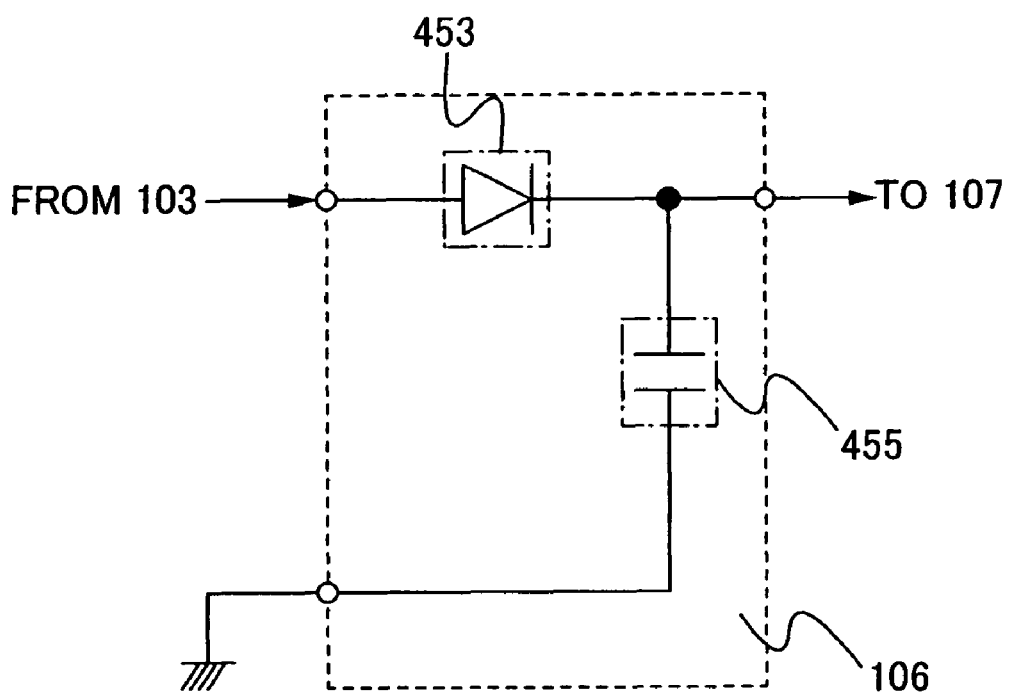

Furthermore, the rectifier circuit 106 in the power transmitter and receiver portion 101 shown in FIG. 1 may be any circuit as long as it converts AC signals, induced by the first radio (wireless) signals which are received at the first antenna circuit 103, into DC signals. The rectifier circuit 106 is mainly composed of a diode and a smoothing capacitor. The rectifier circuit 106 may also include a resistor and a capacitor for matching of impedance. For example, the rectifier circuit 106 is formed of a diode 453 and a smoothing capacitor 455 as shown in FIG. 4B.

Figure 5A:
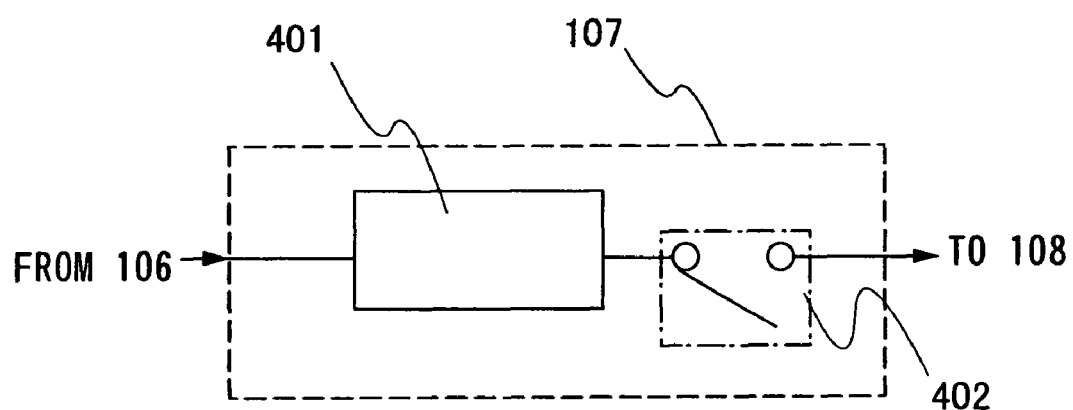
FIGS. 5A and 5B are diagrams showing structures of Embodiment Mode 1.
Figure 5B:
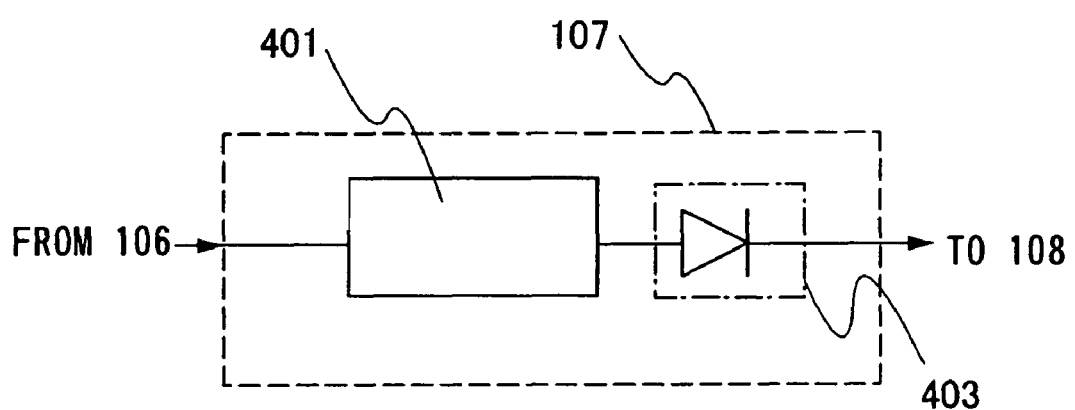

The charging control circuit 107 in the power transmitter and receiver portion 101 may be any circuit as long as it controls the voltage level of electric signals input from the rectifier circuit 106 and outputs the voltage level to the battery 108. For example, the charging control circuit 107 may be formed with a regulator 401 and a diode 403 having a rectifying property as shown in FIG. 5A. The diode 403 prevents electricity stored in the battery 108 from leaking. Therefore, the diode 403 may be replaced with a switch 402 as shown in FIG. 5B. In the case where the switch 402 is provided, electricity stored in the battery 108 is prevented from leaking by turning on the switch while the battery 108 is being charged, and by turning off the switch while the battery 108 is not being charged.

The electric signals whose voltage level is controlled by the charging control circuit 107 in the power transmitter and receiver portion 101 shown in FIG. 1 are input to the battery 108 to charge it. Electricity stored in the battery 108 is supplied to the second antenna circuit 105 through the discharging control circuit 109 (the battery 108 is discharged).

Note that a battery in the invention corresponds to a power storage means whose continuous operating time may be restored by charging. As a power storage means, a secondary battery, a capacitor, and the like are given but these power storage means are collectively referred to as a battery in this specification. As a battery, a sheet-shaped secondary battery is preferably used, and for example, reduction in size may be achieved by using a lithium battery, preferably a lithium polymer battery utilizing a gel-like electrolyte, a lithium ion battery, a lithium secondary battery, or the like although the type of the battery may differ depending on the intended use of the device. Needless to say, any battery may be used as long as it is chargeable. For example, the following batteries that are chargeable and dischargeable may be used: a nickel metal hydride battery, a nickel cadmium battery, an organic radical battery, a lead-acid battery, an air secondary battery, a nickel-zinc battery, and a silver-zinc battery. Alternatively, a capacitor may be used.

Note that as a capacitor that may be used as the battery 108 of the invention, it is preferable to use a capacitor having electrodes whose opposed areas are large. A capacitor has a simpler structure than a battery. A capacitor may be easily formed to be thin and formed by stacking layers. In particular, it is preferable to use a double-layer electric capacitor which is formed of an electrode material having a large specific surface area such as activated carbon, fullerene, or a carbon nanotube. A double-layer electric capacitor has a function of storing electricity and will not deteriorate much even after it is charged and discharged a number of times. Further, the double-layer electric capacitor has an excellent property in that it may be charged rapidly.

Note that in this embodiment mode, electricity that is stored in the battery 108 is not limited to the first radio (wireless) signals received at the first antenna circuit 103. In addition, it is also possible to employ a structure where a power generation element is supplementarily provided in a part of the power transmitter and receiver portion 101. Using the structure including the power generation element is advantageous in that the amount of electricity supplied for storage in the battery 108 may be increased and the charging rate may be increased. Note that as the power generation element, for example, a power generation element using a solar cell, a power generation element using a piezoelectric element, or a power generation element using a micro electro mechanical system (MEMS) may be used.

Figure 6A:
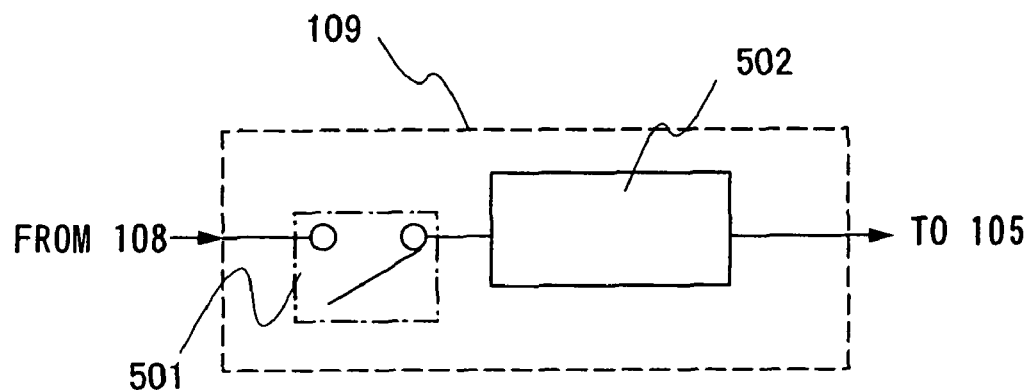
FIGS. 6A and 6B are diagrams showing structures of Embodiment Mode 1.

The discharging control circuit 109 in FIG. 1 may be any circuit as long as it controls the level of voltage output from the battery 108, and controls discharging of the battery 108. For example, as shown in FIG. 6A, the discharging control circuit 109 may be formed with a switch 501 and a regulator 502. Whether electricity is supplied or not supplied to the second antenna circuit 105 from the battery 108 may be controlled by controlling on/off of the switch 501.

Figure 6B:
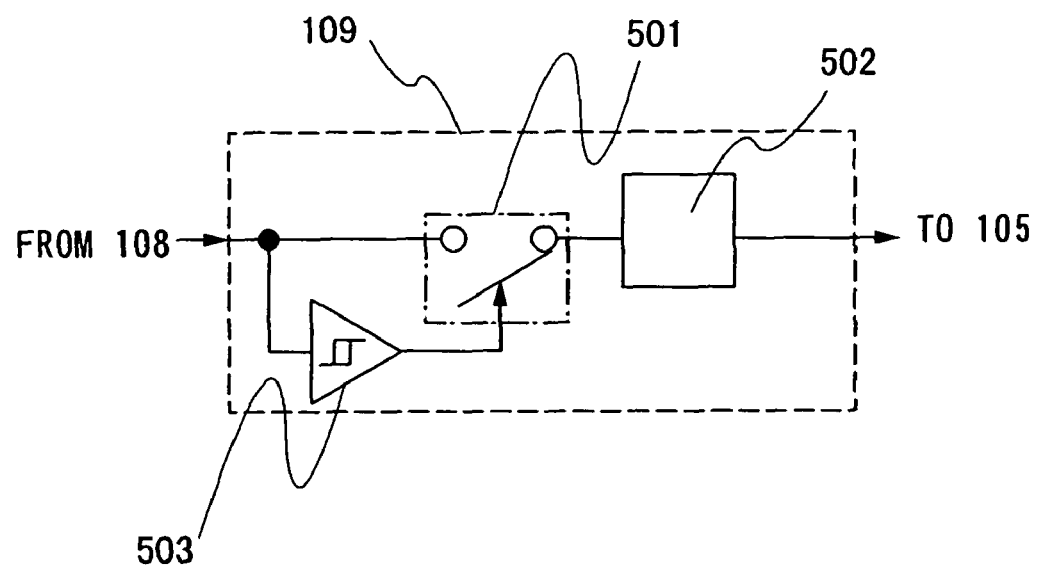

Further, the discharging control circuit 109 may have a structure in which on/off of the switch 501 is controlled depending on the voltage level of the battery 108. For example, a Schmidt trigger 503 may be added to the structure shown in FIG. 6A (see FIG. 6B). The Schmidt trigger 503 can provide a hysteresis characteristic to a switching element. Specifically, the Schmidt trigger 503 has two different threshold levels: the upper limit and the lower limit to the input voltage. On/off of the switch 501 is controlled in accordance with whether the input voltage is higher or lower than the upper limit or the lower limit. For example, the switch 501 is turned on when the voltage value of the battery 108 is more than or equal to 5 V, and is turned off when the voltage value of the battery 108 is less than or equal to 3 V. Therefore, only when the battery 108 is charged with a certain level of electricity, electricity is supplied to the second antenna circuit 105.

Figure 12:
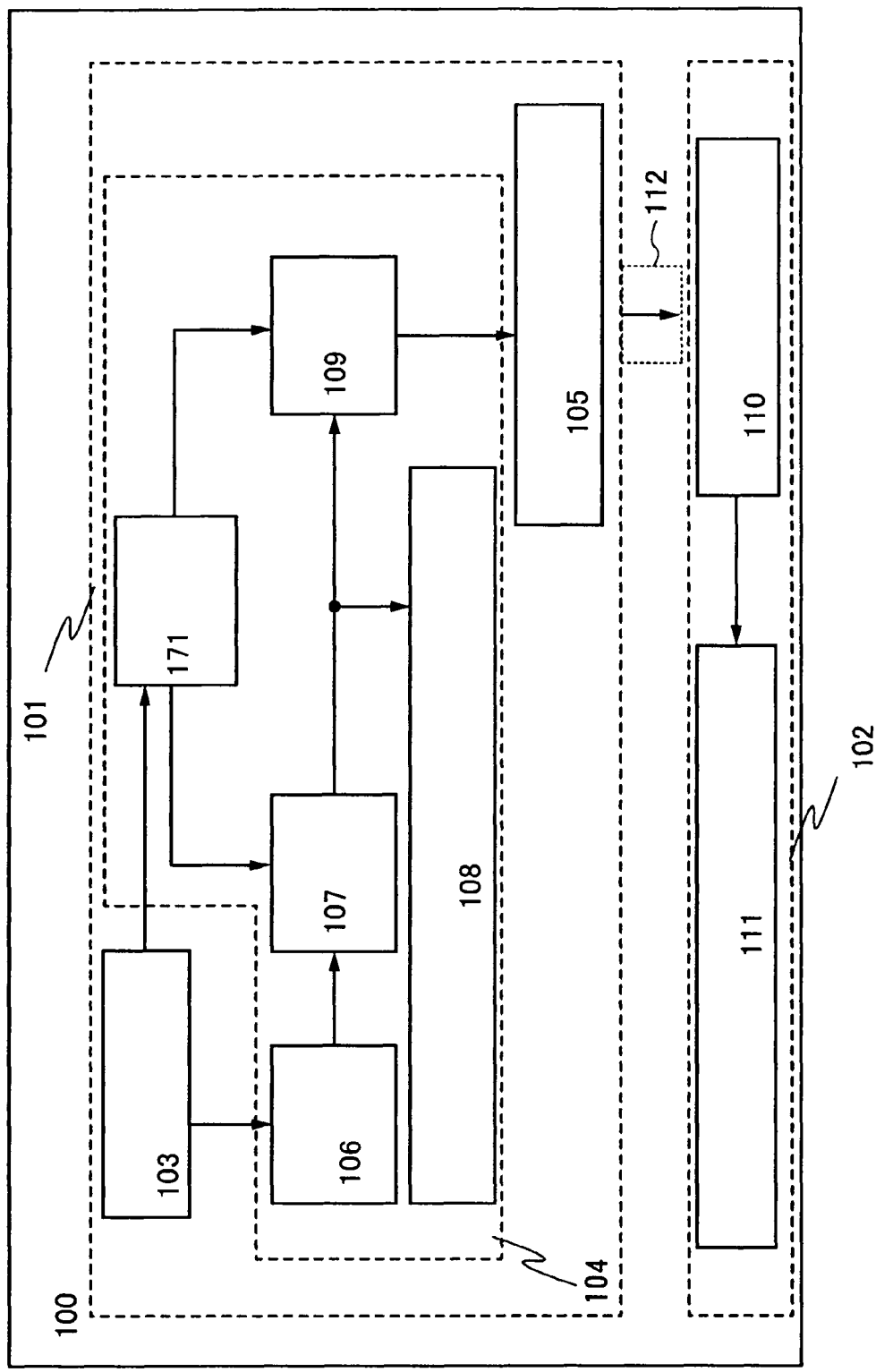
FIG. 12 is a diagram showing a structure of Embodiment Mode 1.

Note that the wireless power receiving device of the invention may include a charging and discharging control circuit which controls the switch 402 in the charging control circuit and the switch 501 in the discharging control circuit. FIG. 12 illustrates the structure shown in FIG. 1 in which the charging and discharging control circuit 171 is added. The charging and discharging control circuit 171 may be any circuit as long as it monitors the charged state of the battery 108, and controls the switch 402 provided in the charging control circuit 107, and the switch 501 provided in the discharging control circuit 109 in accordance with the charged state of the battery 108. For example, the charging and discharging control circuit 171 monitors the reception condition of the first radio (wireless) signals received at the first antenna circuit, or the voltage value of the battery 108 and controls the switch 402 provided in the charging control circuit 107 and the switch 501 provided in the discharging control circuit 109 so that charging and discharging of the battery 108 is regulated. By controlling charging of the battery 108 by using the charging and discharging control circuit 171 in accordance with the charged state of the battery 108, overcharge of the battery 108 and leakage of the power stored in the battery 108 may be controlled or prevented.

Figure 7:
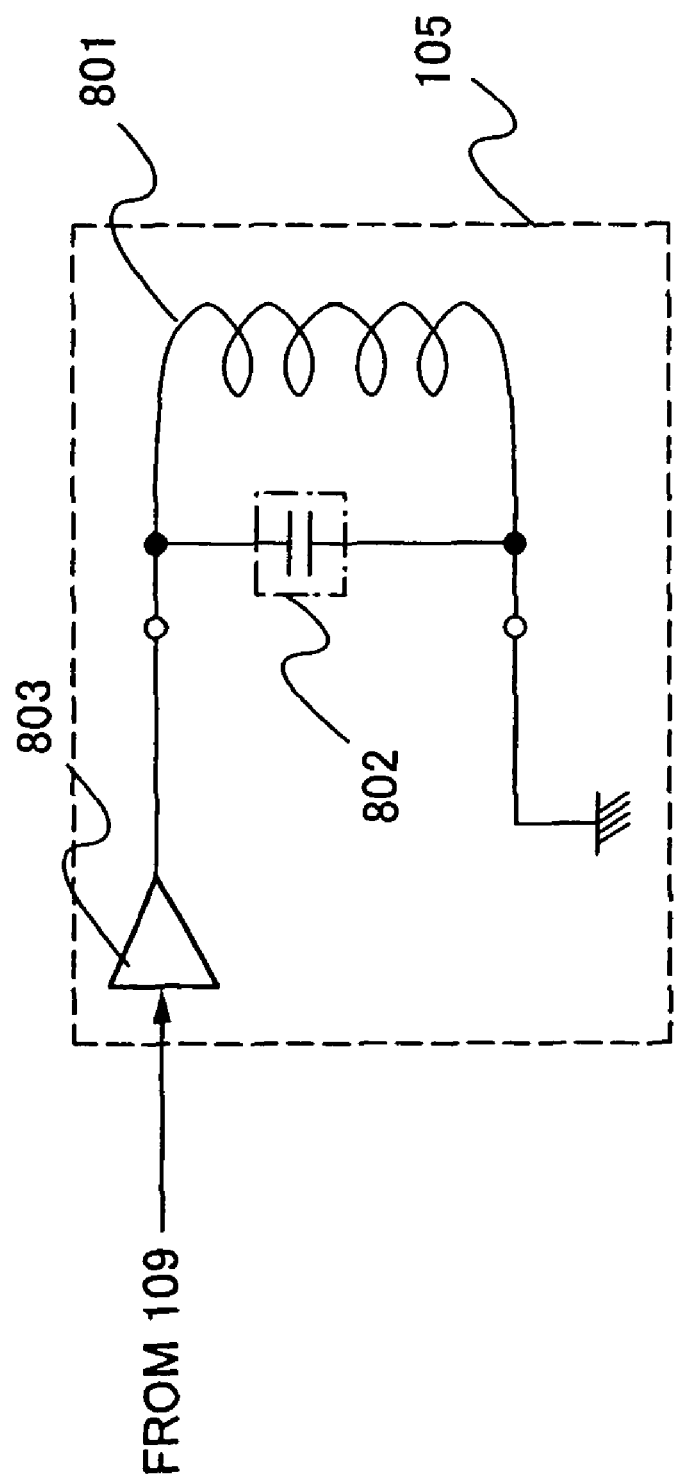
FIG. 7 is a diagram showing a structure of Embodiment Mode 1.

FIG. 7 illustrates an exemplary structure of the second antenna circuit 105 which transmits electromagnetic waves to the load portion 102 from the power transmitter and receiver portion 101 shown in FIG. 1. In FIG. 7, the second antenna circuit 105 includes an antenna 801, a resonance capacitor 802, and an amplifier 803. Note that in this embodiment mode, the antenna 801, the resonance capacitor 802, and the amplifier 803 are collectively referred to as the second antenna circuit 105. The second antenna circuit 105 having the amplifier 803 in FIG. 7 amplifies the amplitude of signals to be transmitted from the second antenna circuit 105 so that the second antenna circuit 105 can supply electricity by using the signals transmitted to the third antenna circuit. Note that the second antenna circuit 105 is not limited to the structure shown in FIG. 7 and any structure may be employed as long as it can supply electricity by using electromagnetic waves to the third antenna circuit 110 in the load portion 102.

Figure 19:
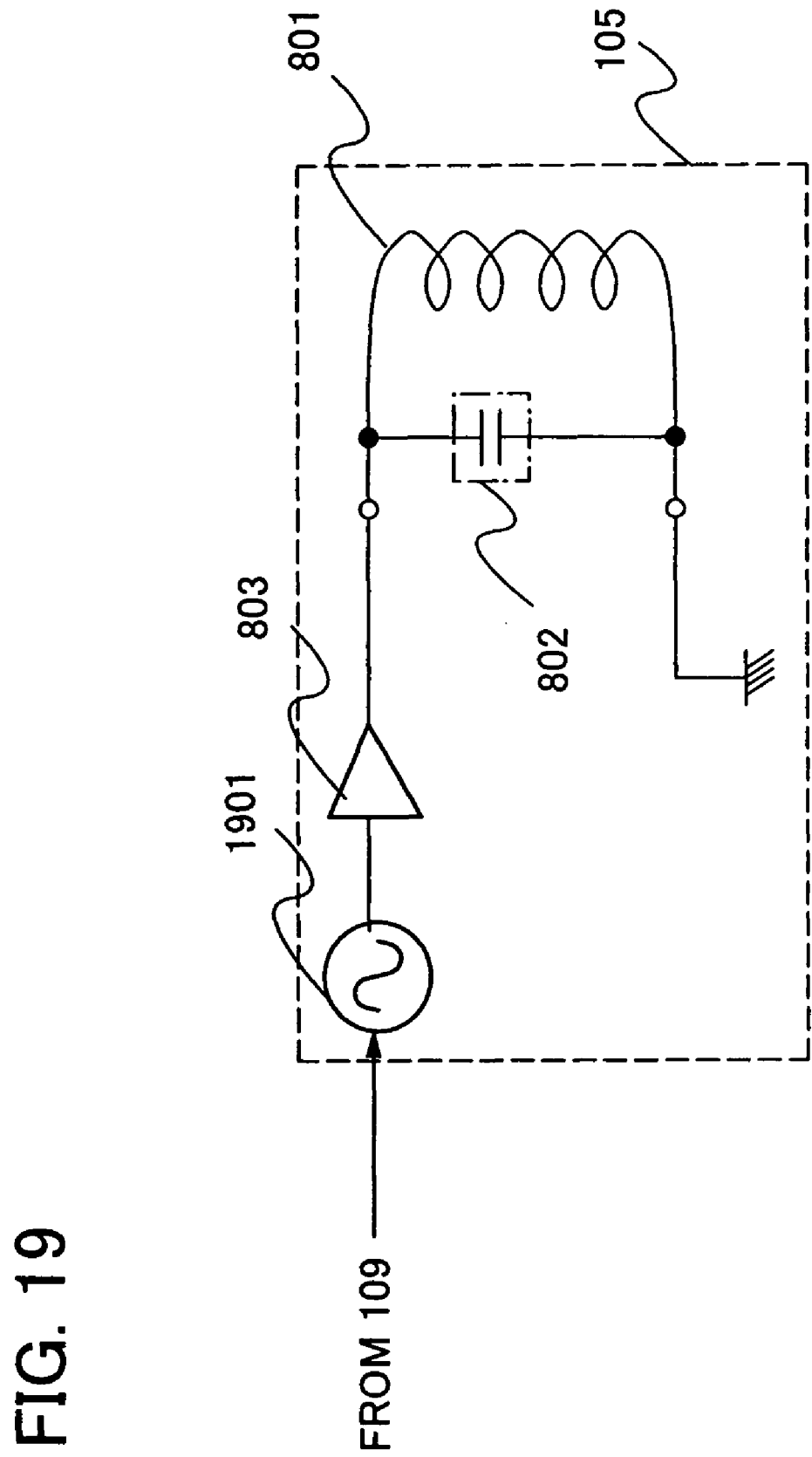
FIG. 19 is a diagram showing a structure of Embodiment Mode 1.

Further, FIG. 19 illustrates another structure of the second antenna circuit 105, different from the structure shown in FIG. 7. In FIG. 19, the second antenna circuit 105 includes the antenna 801, the resonance capacitor 802, the amplifier 803, and an oscillator 1901. The structure in FIG. 19 differs from the structure in FIG. 7 in having the oscillator 1901. The second antenna circuit 105 in FIG. 19 which includes the oscillator 1901 can make the frequency of the radio signals transmitted from the second antenna circuit 105 different from the frequency of the first radio signals.

In this specification, the electromagnetic waves transmitted from the second antenna circuit 105 and received at the third antenna circuit 110 are referred to as second radio signals.

As a power transmission method using a second radio (wireless) signal 112 from the second antenna circuit 105 in the power transmitter and receiver portion 101 to the third antenna circuit 110 in the load portion 102, the electromagnetic coupling method or the electromagnetic induction method (for example, a 13.56 MHz band) is preferably used because electricity may be efficiently supplied by using electromagnetic induction caused by change in the magnetic field density. In the case where the electromagnetic coupling method or the electromagnetic induction method is employed, conductive films functioning as the second antenna circuit 105 and the third antenna circuit 110 are formed in a circle (for example, a loop antenna) or a spiral (for example, a spiral antenna). In the case of employing the micro-wave method (for example, a UHF band (860 to 960 MHz band), a 2.45 GHz band, or the like) for power transmission from the second antenna circuit in the power transmitter and receiver portion 101 to the third antenna circuit in the load portion 102 by using the second radio signal 112, the shape and the length of the conductive film serving as the antenna may be appropriately determined in consideration of the wavelength of the electromagnetic waves used for signal transmission. Therefore, transmission and reception of electromagnetic waves may be performed even with a long distance in-between. In the case where the micro-wave method is employed, the conductive film serving as the antenna may be formed, for example, in a linear shape (for example, a dipole antenna), in a flat shape (for example, a patch antenna), and the like. Further, the shape of the conductive film functioning as the antenna is not limited to a linear shape; the shape may be a curved-line shape, a meander shape, or a combination thereof, considering the wavelength of the electromagnetic waves.

In addition, the structure of the third antenna circuit 110 in the load portion 102, which receives the second radio (wireless) signals 112 from the second antenna circuit 105 is the same as the structure shown in FIG. 4A which illustrates the structure of the above-described first antenna circuit.

In the present invention, antennas of the above-described first antenna circuit 103, second antenna circuit 105, and third antenna circuit 110 may have different shapes. Therefore, the first radio signals received at the first antenna circuit 103 and the second radio signals transmitted and received between the second antenna circuit and the third antenna circuit may employ different types of power transmission methods using radio signals with different frequencies. In the wireless power receiving device of the invention, the power transmitter/receiver portion 101 and the load portion 102 are formed separately so that they may be easily removed if desired. Accordingly, every time the frequency of the electromagnetic waves received at the first antenna circuit changes, the shape of the antenna may be adjusted by merely changing the power transmitter/receiver portion having the first antenna circuit. Therefore, the wireless power receiving device of the invention may be produced at low cost by reducing production cost for replacement of the first antenna.

The invention includes the battery portion having the antenna which receives the first radio signals and the battery which accumulates electricity supplied through the first radio signals, and the load portion having the load supplied with electricity, which are formed separately so that the load portion is supplied with electricity through the second radio signals transmitted and received between the second antenna circuit and the third antenna circuit. Therefore, electricity may be transmitted from the battery portion which accumulates electricity supplied through the electromagnetic waves, to the load portion supplied with electricity without using a penetration electrode or a wire bonding or the like. Accordingly, defects such as disconnection or poor connection may be reduced.

In addition, the structure of the load 111 in the load portion 102 shown in FIG. 1 differs from mobile electronic device to mobile electronic device. As an example of the load 111, a display device such as an electronic paper is given. Moreover, as the load 111, motive power to drive a sensor for regularly measuring a temperature, a pressure, and the like, a data signal transmission portion, and the like are given. In the case where the load portion 102 is an RF tag, the load 111 may be a demodulation circuit, a modulation circuit, and the like.

Operation of the wireless power receiving device shown in FIG. 1 will be described with reference to a flow chart in FIG. 9.

First, the first antenna circuit 103 in the wireless power receiving device 100 receives the first radio signal for charging the battery from an outside electromagnetic wave feeder (Step 901). When the first circuit 103 receives the first radio signal, the switch 402 in the charging control circuit 107 is turned on and the switch 501 in the discharging control circuit 109 is turned off at the same time so that the battery 108 starts to be charged (Step 902). The switch 402 in the charging control circuit 107 and the switch 501 in the discharging control circuit 109 remain on or off respectively until the battery 108 is charged with a certain amount of electricity (NO flow of Step 903). When the battery 108 is fully charged (YES flow of Step 903), the switch 402 in the charging control circuit 107 is turned off while the switch 501 in the discharging control circuit 109 is turned on so that discharging the battery 108 to the second antenna circuit 105 starts (Step 904). Upon discharging the battery 108 to the second antenna circuit 105, the amplifier 803 in the second antenna circuit 105 operates so that the second radio signal 112 is transmitted to the third antenna circuit 110 from the second antenna circuit 105 (Step 905). In the case where electricity is stored in the battery 108, the switch 402 in the charging control circuit 107 and the switch 501 in the discharging control circuit 109 remain off or on respectively (NO flow of Step 906). When the discharge of the battery 108 is finished, in other words, the battery has run out of electricity; transmission of the second radio (wireless) signal 112 from the second antenna circuit 105 to the third antenna circuit 110 is completed (YES flow of Step 906).

Figure 9:
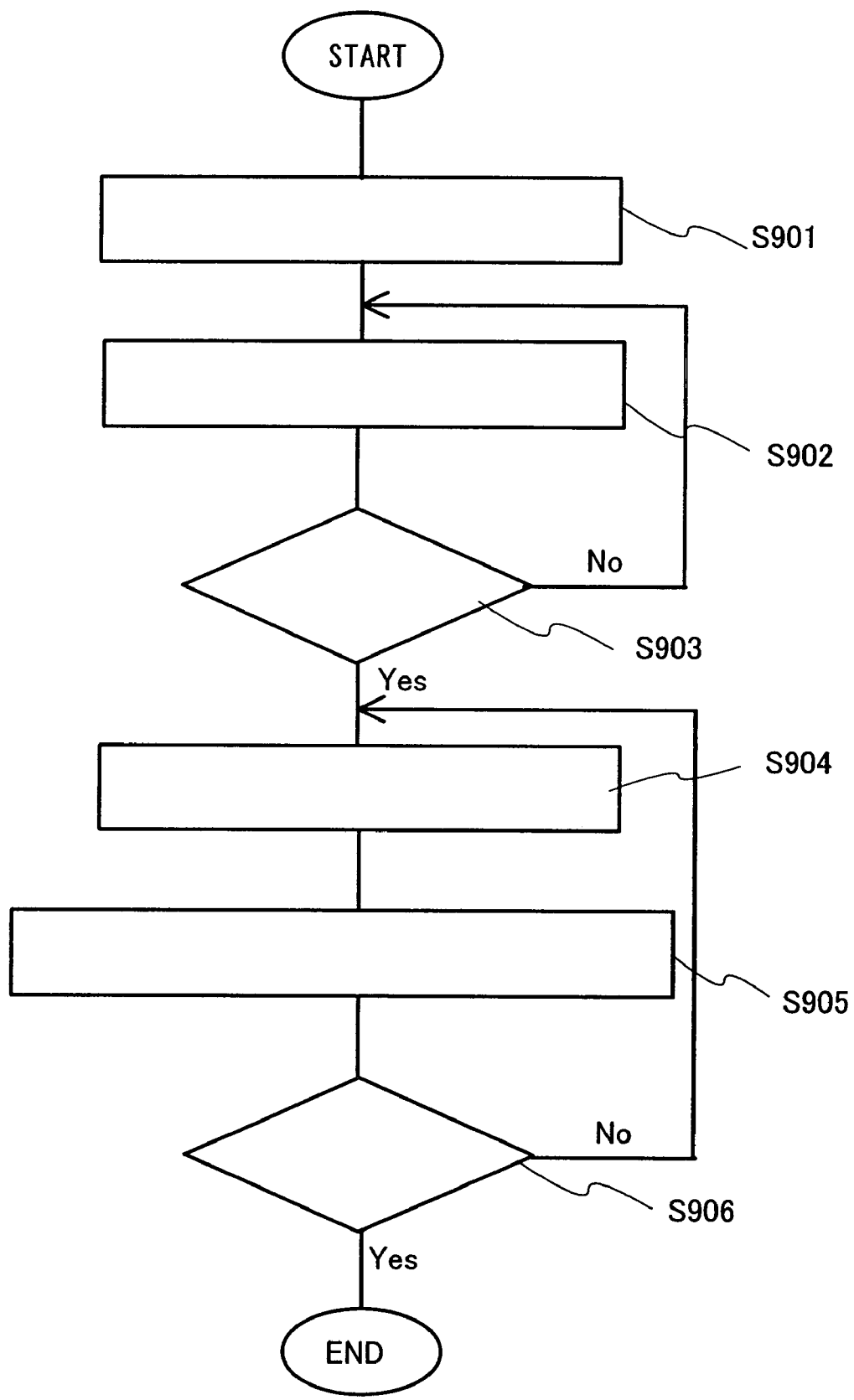
FIG. 9 is a flow chart showing operation of Embodiment Mode 1.

Although the flow chart shown in FIG. 9 illustrates whether discharge of the battery 108 is completed or not in Step 906, the invention is not limited thereto. Discharging of the battery 108 may be completed during the period in which electricity is not consumed in the load portion so that the flow may go on to Step 902 to start charging.

Next, a flow chart of discharging of the battery 108 provided in the wireless power receiving device 100 shown in FIG. 9 is described with reference to drawings.

In the wireless power receiving device 100 described in this embodiment mode, the battery is charged cumulatively and discharged in pulses (Step 901 and Step 902 in FIG. 9). To charge cumulatively is (means) to charge the battery by taking in and adding up the electromagnetic waves received at the first antenna circuit 103, which includes not only the case where the electromagnetic waves are continuously taken in but also the case where the electromagnetic waves are intermittently taken in. To discharge in pulses is (means) to discharge the battery intermittently in a short time (power supply to the second antenna circuit 105) compared to a charging time of the battery 108.

Figure 10A:
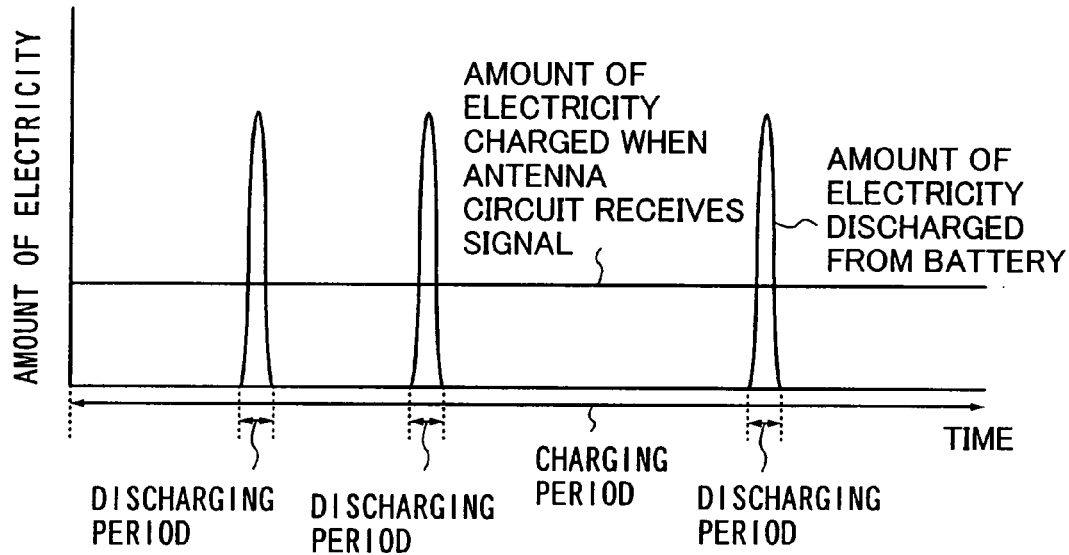
FIGS. 10A and 10B are diagrams showing the relationship between a charging and discharging period and electricity in Embodiment Mode 1.

For example, as shown in FIG. 10A, the battery 108 is charged little by little by constantly taking in electromagnetic waves for a given period of time so that electricity stored in the battery 108 is supplied to the second antenna circuit 105 in a short time (Steps 903 and 904 in FIG. 9). Therefore, the oscillator 1901 in the second antenna circuit 105 operates so that transmission of the electromagnetic waves to the third antenna circuit 110 is performed (Step 905 in FIG. 9).

The wireless power receiving device shown in FIG. 1 is taken for example. The battery 108 is gradually charged with electricity through the electromagnetic waves taken for a given period of time. When the potential of the battery 108 reaches a given value, the switch 501 in the discharging control circuit 109 is turned on so that a large amount of electricity in pulses is supplied to the second antenna circuit 105. Electricity may be continuously supplied to the second antenna circuit 105 until the potential of the battery 108 gets lower than a specific value. When the potential of the battery 108 gets lower than the specific value, the switch in the discharging control circuit 109 is turned off and power supply from the battery 108 to the load portion 102 stops. When the potential of the battery 108 gets higher than the specific value by charging, the switch in the discharging control circuit 109 is turned on again to supply a large amount of electricity to the load portion 102.

As described above, charging the battery through reception of the electromagnetic waves for a given period of time and discharging the stored electricity in pulses enable the battery to supply a large amount of electricity to the load portion even when the electromagnetic waves for charging the battery are weak. In this case, the charging period of the battery is longer than the discharging period of the battery. In addition, the amount of electricity discharged from the battery per unit time (electricity supplied to the load portion 102) is larger than that of electricity stored in the battery per unit time. Note that FIG. 10A illustrates an example in which the first antenna circuit 103 charges the battery with a given amount of electricity per unit time by continuously taking in the electromagnetic waves. However, the invention is not limited to the case where the electromagnetic waves are continuously taken in, and pulse waves or modulated electromagnetic waves may be taken in for charging the battery.

Figure 10B:
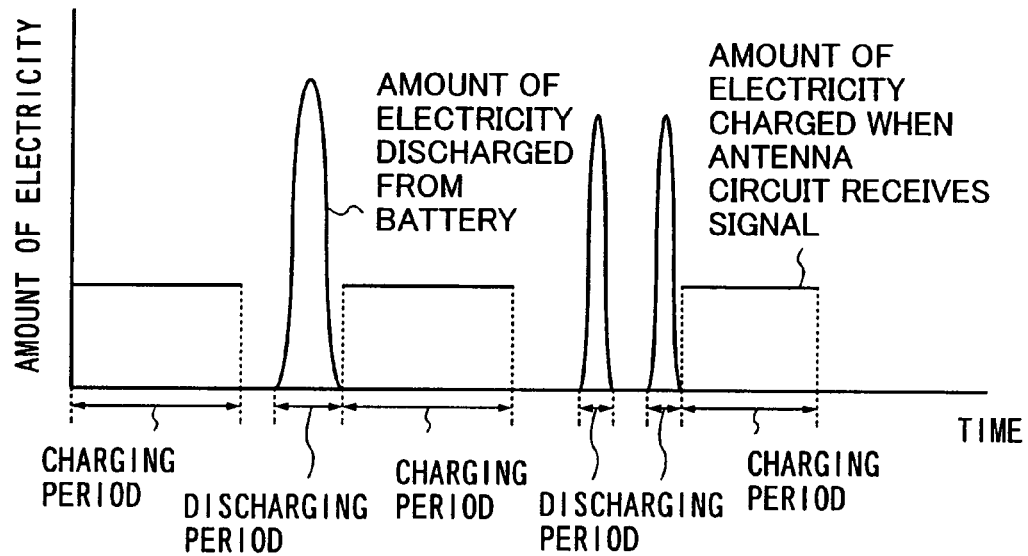

Moreover, as shown in FIG. 10B, the wireless power receiving device may be configured so as to stop charging when the battery 108 is fully charged and to start charging the battery 108 when the voltage of the battery 108 gets lower than a given value due to power supply to the load portion 102. For discharging the battery 108, the switch of the discharging control circuit 109 may be kept on until the voltage of the battery 108 gets lower than a given value so that electricity is supplied every time the load portion 102 operates. Alternatively, the switch of the discharging control circuit 109 may be controlled by using signals from outside.

Figure 11:
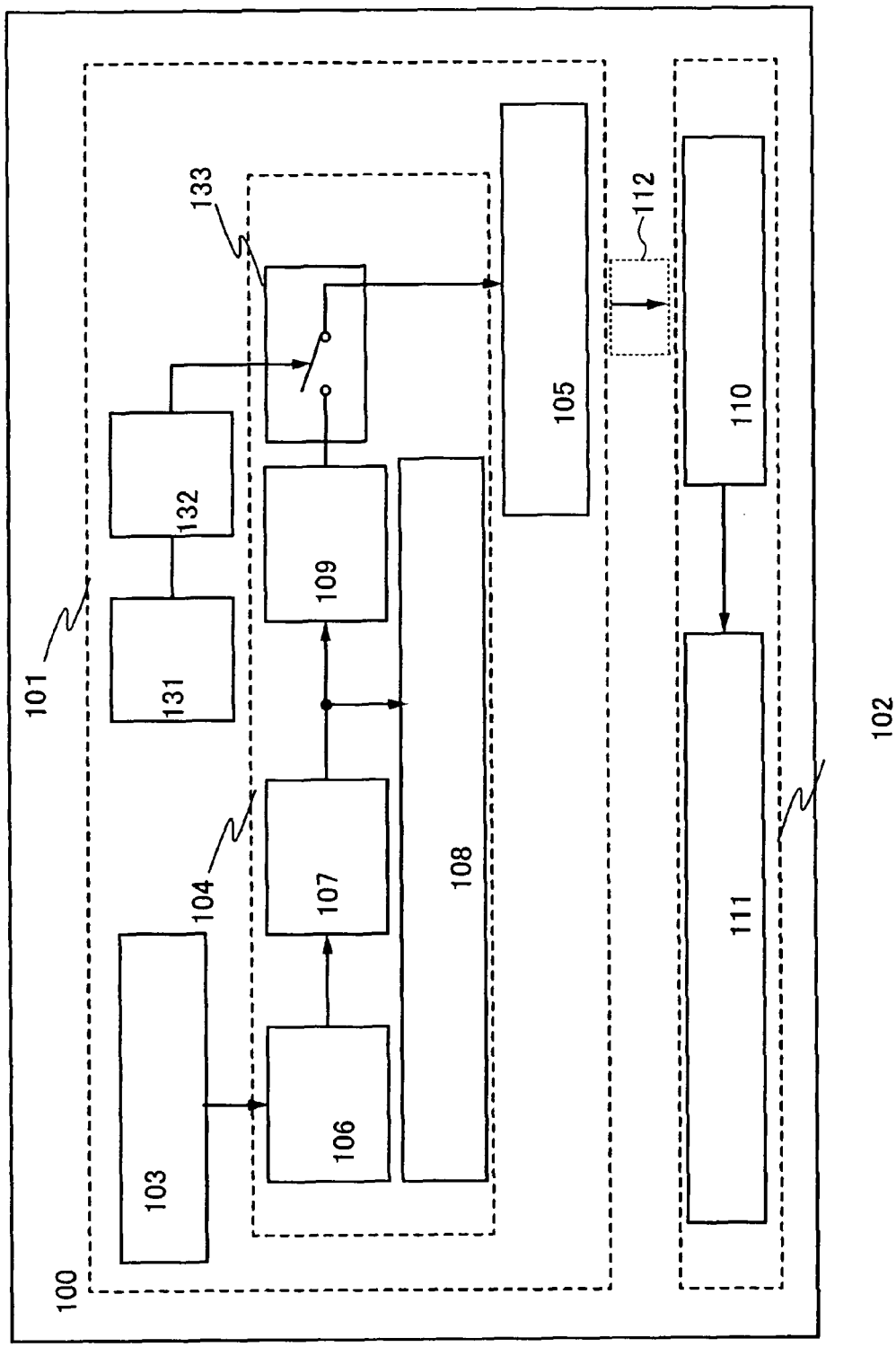
FIG. 11 is a diagram showing a structure of Embodiment Mode 1.

Note that in the case where electricity stored in the battery 108 is discharged in pulses to the second antenna circuit 105, a switch circuit may be provided between the discharging control circuit 109 and the second antenna circuit 105 so that the switch circuit is periodically turned on in order to intermittently supply electricity to the second antenna circuit 105. For example, as shown in FIG. 11, a switch circuit 133 may be provided between the discharging control circuit 109 and the second antenna circuit 105, and on/off control of the switch provided in the switch circuit 133 may be periodically performed by using a clock generator circuit 131 and a divider circuit 132. In this case, when the switch 501 in the discharging control circuit 109 and the switch provided in the switch circuit 133 are turned on, electricity is supplied to the second antenna circuit 105 from the battery 108. In addition, electricity required for operating the clock generator circuit 131 and the divider circuit 132 may be supplied from the battery 108. Note that in the structure shown in FIG. 11, a practitioner may appropriately design the clock generator circuit 131 and the switch circuit 133 in order to properly control on/off period and the like of the switch provided in the switch circuit 133.

As described above, in the present invention, antennas in the first antenna circuit 103, the second antenna circuit 105, and the third antenna circuit 110 may be formed to have different shapes. That is, the first radio (wireless) signals received at the first antenna circuit 103 and the second radio (wireless) signals transmitted/received between the second antenna circuit 105 and the third antenna circuit 110 may employ different types of power transmission methods using radio signals with different frequencies. In addition, in the wireless power receiving device of the invention, the power transmitter and receiver portion 101 and the load portion 102 are formed separately so that they may be easily removed if desired. Accordingly, every time the frequency of the electromagnetic waves received at the first antenna circuit changes, the shape of the antenna may be adjusted by merely changing the power transmitter and receiver portion having the first antenna circuit. Therefore, the wireless power receiving device of the invention may be produced at low cost by reducing production cost for replacement of the first antenna.

Moreover, in the present invention, the battery portion including the battery which accumulates electricity supplied through the first radio signal and the antenna which receives the first radio signal, and the load portion including the load supplied with electricity are formed separately so that the load portion is supplied with electricity through the second radio signals transmitted and received between the second antenna circuit and the third antenna circuit. Therefore, electricity may be transmitted from the battery portion which accumulates electricity supplied through the first radio signal, to the load portion supplied with electricity without using a penetration electrode or a wire bonding or the like. Accordingly, defects such as disconnection or poor connection may be reduced.

Note that the structure of the wireless power receiving device in this embodiment mode may be combined with the structure of the wireless power receiving device in the other embodiment modes in this specification.

Embodiment Mode 2

This embodiment mode will describe an example of the wireless power receiving device provided with an RF tag as the load of the wireless power receiving device shown in Embodiment Mode 1 with reference to drawings. Note that the structure in this embodiment mode is not limited to the RF tag and may be applied to any data transmitter and receiver device which is capable of communicating data wirelessly.

An example of the wireless power receiving device in this embodiment mode will be described with reference to FIG. 13.

Figure 13:
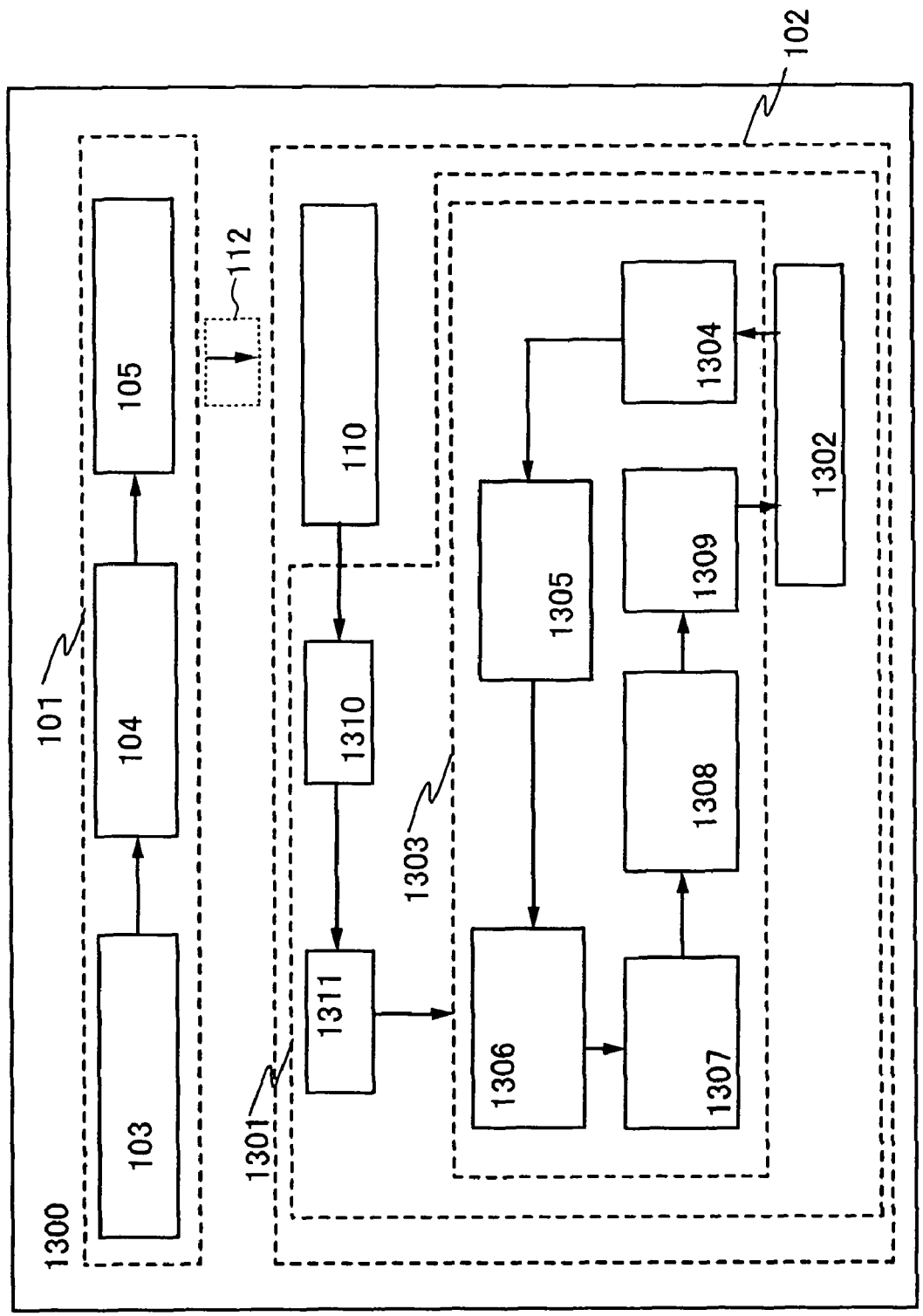
FIG. 13 is a diagram showing a structure of Embodiment Mode 2.

The wireless power receiving device 1300 shown in FIG. 13 includes the power transmitter and receiver portion 101, and the load portion 102. The power transmitter and receiver portion 101 includes the first antenna circuit 103, the battery portion 104, and the second antenna circuit 105. In addition, the load portion 102 includes the third antenna circuit 110 and an RF tag 1301.

Note that the structures of the first antenna circuit 103, the battery portion 104, the second antenna circuit 105, and the third antenna circuit 110 are the same as those described in Embodiment Mode 1. In addition, the difference of the structure from that shown in FIG. 1 in Embodiment Mode 1 is that the RF tag 1301 is substituted for the load 111.

The RF tag 1301 includes a fourth antenna circuit 1302, a signal processing circuit 1303, a rectifier circuit 1310, and a power supply circuit 1311. In addition, the signal processing circuit 1303 includes a demodulation circuit 1304, a logic circuit 1305, a memory control circuit 1306, a memory circuit 1307, a logic circuit 1308, and a modulation circuit 1309.

In the signal processing circuit 1303, a communication signal transmitted from a reader/writer and received at the fourth antenna circuit 1302 is input to the demodulation circuit 1304 included in the signal processing circuit 1303. Typically, communication signals are transmitted through a process such as ASK (amplitude shift keying) modulation or FSK (frequency shift keying) modulation of carriers of 13.56 MHz, 915 MHz, or the like.

Note that the structure of the fourth antenna circuit 1302 in this embodiment mode may be the same as that of the first antenna circuit 103 in Embodiment Mode 1.

In FIG. 13, the modulated communication signal received at the fourth antenna circuit 1302 is demodulated in the demodulation circuit 1304. The demodulated signal is transmitted to the logic circuit 1305 to be analyzed. The signal analyzed in the logic circuit 1305 is transmitted to the memory control circuit 1306. In accordance with the signal analyzed in the logic circuit 1305, the memory control circuit 1306 controls the memory circuit 1307. Data stored in the memory circuit 1307 is retrieved and transmitted to the logic circuit 1308 by the memory control circuit 1306. Data retrieved from the memory circuit 1307 is modulated in the modulation circuit 1309 after encoded in the logic circuit 1308. Then, the radio signal is transmitted from the fourth antenna circuit 1302 to the reader/writer.

Note that electricity is supplied to the signal processing circuit 1303 in FIG. 13 as follows: the second radio signal is received at the third antenna circuit through the second antenna circuit 105 from the battery portion 104 in the power transmitter and receiver portion 101; then, the second radio signal is rectified and smoothed in the rectifier circuit 1310 and made a constant voltage in the power supply circuit 1311 to be supplied to the signal processing circuit 1303. In such a manner, the RF tag 1301 operates.

In order to process signals in the signal processing circuit 1303, a reference clock signal is required. For example, the carrier of 13.56 MHz may be used for the clock signal. Alternatively, a clock generation circuit may be provided in the RF tag 1301 to acquire power supply from the power supply circuit 1311 so that clock signals are stably supplied to the signal processing circuit 1303.

In addition, as shown in FIG. 11 in Embodiment Mode 1, the switch circuit 133 is provided between the discharging control circuit 109 in the battery portion 104 and the second antenna circuit 105 in order to operate the signal processing circuit 1303 by intermittently supplying electricity to the RF tag 1301 from the battery 108. In this case, transmission and reception of signals between the signal processing circuit 1303 and the reader/writer may be periodically performed through the fourth antenna circuit 1302. In particular, in the structure in which the RF tag is substituted for the load described in this embodiment mode, signals are not constantly transmitted or received so that electricity is efficiently consumed in transmission and reception of signals by supplying electricity intermittently.

Note that the structure of the wireless power receiving device in this embodiment mode may be combined with the structure of the wireless power receiving device in the other embodiment modes in this specification. That is, as described in Embodiment Mode 1, the antennas in the first antenna circuit 103, the second antenna circuit 105, and the third antenna circuit 110 may be formed to have different shapes. In other words, each of the first radio signal received at the first antenna circuit 103 and the second radio signal transmitted and received between the second antenna circuit and the third antenna circuit may employ different types of power transmission methods using radio signals with different frequencies. By forming the power transmitter and receiver portion 101 and the load portion 102 separately, in the wireless power receiving device of the invention, the power transmitter and receiver portion and the load portion may be easily removed if desired. Accordingly, every time the frequency of the electromagnetic waves received at the first antenna circuit changes, the shape of the antenna may be adjusted by merely changing the power transmitter and receiver portion having the first antenna circuit. Therefore, the wireless power receiving device of the invention may be produced at low cost by reducing production cost for replacement of the first antenna.

Moreover, in the wireless power receiving device of this embodiment mode, the battery portion including the battery which accumulates electricity supplied through the first radio signal and the antenna which receives the first radio signal, and the load portion including the load supplied with electricity are formed separately so that the load portion is supplied with electricity through the second radio signal transmitted and received between the second antenna circuit and the third antenna circuit. Therefore, electricity may be transmitted from the battery portion which accumulates electricity supplied through the first radio signal, to the load portion supplied with electricity without using a penetration electrode or a wire bonding or the like. Accordingly, defects such as disconnection or poor connection may be reduced.

Embodiment Mode 3

In this embodiment mode, as the load in the wireless power receiving device shown in Embodiment Mode 2, one example of the wireless power receiving device including the rectifier circuit, the power supply circuit, and the signal processing circuit in the RF tag of Embodiment Mode 2 will be described with reference to drawings. In this embodiment mode, a configuration in which communication signals are transmitted to and received from the outside and electricity is supplied through the radio signals, by using a power transmitter and receiver portion will be described.

One example of the wireless power receiving device in this embodiment mode will be described with reference to FIG. 16.

Figure 16:
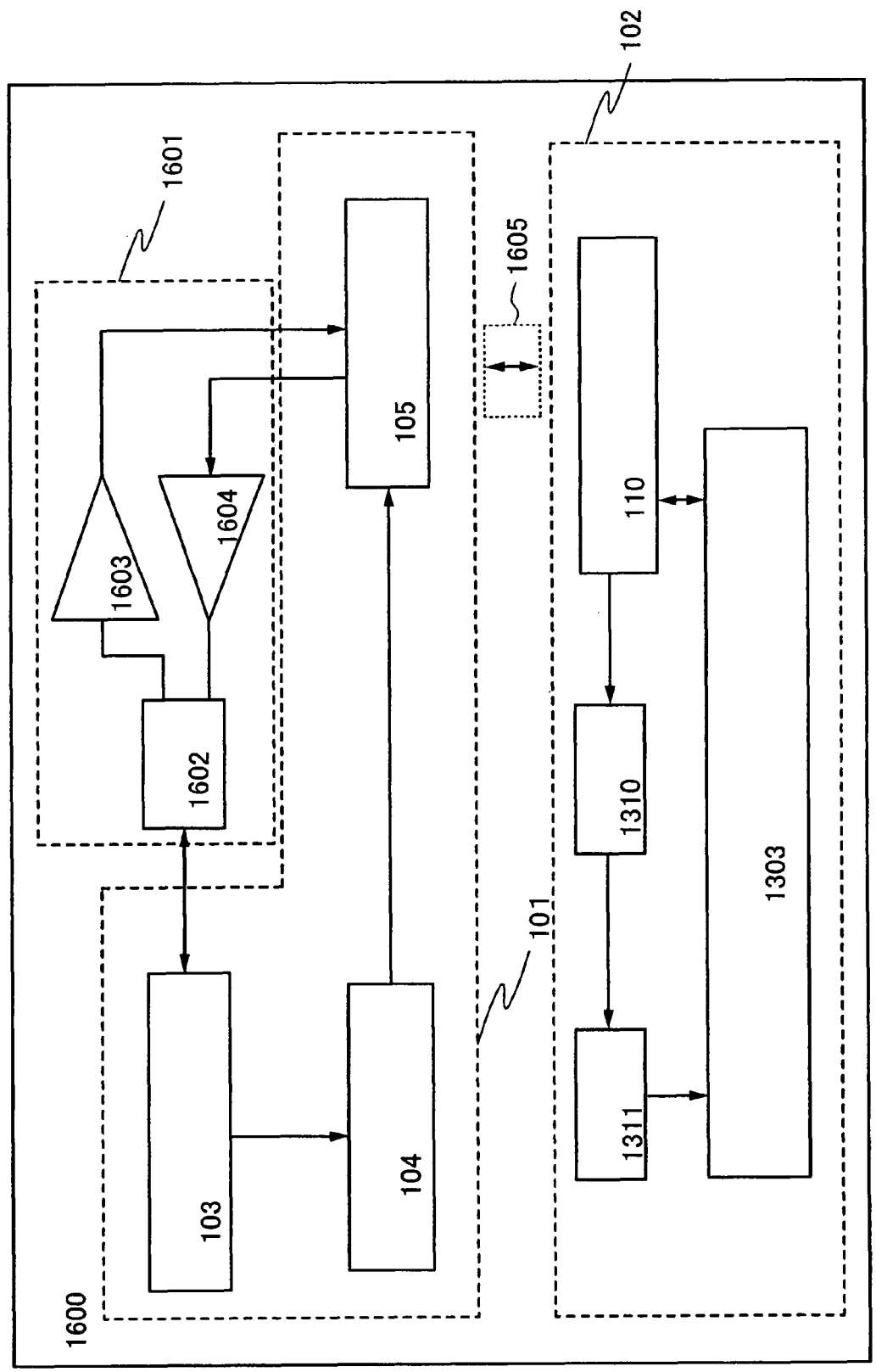
FIG. 16 is a diagram showing a structure of Embodiment Mode 3.

A wireless power receiving device 1600 shown in FIG. 16 includes the power transmitter and receiver portion 101, the load portion 102, and a signal transmitter/receiver portion 1601. The power transmitter and receiver portion 101 includes the first antenna circuit 103, the battery portion 104, and the second antenna circuit 105. In addition, the load portion 102 includes the third antenna circuit 110, the signal processing circuit 1303, the rectifier circuit 1310, and the power supply circuit 1311. Further, the signal processing circuit 1303 includes the demodulation circuit 1304, the logic circuit 1305, the memory control circuit 1306, the memory circuit 1037, the logic circuit 1308, and the modulation circuit 1309 shown in FIG. 13. Furthermore, the signal transmitter and receiver portion 1601 includes a switch 1602, an amplifier 1603, and an amplifier 1604.

Note that the structures of the first antenna circuit 103, the battery portion 104, the second antenna circuit 105, and the third antenna circuit 110, shown in FIG. 16, are the same as those described in Embodiment Mode 2. The structure shown in FIG. 16 differs from the structure shown in FIG. 13 in Embodiment Mode 2 in that the wireless power receiving device 1600 includes the signal transmitter and receiver portion 1601, and in that the signal processing circuit 1303 in the load portion 102 is not connected to the fourth antenna circuit. Moreover, in this embodiment mode, the structure of the second antenna circuit having an amplifier at the input is the same as the structure of the first antenna circuit 103 because the amplifier does not need to be provided in the second antenna circuit.

In the signal transmitter and receiver portion 1601, a communication signal transmitted from the reader/writer and received at the first antenna circuit 103 is input to the switch 1602 provided in the signal transmitter and receiver portion 1601. Typically, communication signals are transmitted through a process such as ASK (amplitude shift keying) modulation or FSK (frequency shift keying) modulation of carriers of 13.56 MHz, 915 MHz, or the like. Note that on and off of the switch 1602 in the signal transmitter and receiver portion may be controlled as follows: for example, the switch 1602 operates in conjunction with the switch 402 in the charging control circuit 107 included in the battery portion 104 as shown in Embodiment Mode 1 such that the switch 1602 is turned off when the switch 402 is turned on, whereas the switch 1602 is turned on when the switch 402 is turned off. That is, transmission and reception of the communication signals to and from the first antenna circuit and reception of the communication signals at the first antenna circuit for charging the battery are switched alternately. Note that the communication signals may be any signals output from a reader/writer.

In FIG. 16, the modulated communication signal received at the first antenna circuit 103 is amplified in the amplifier 1603. The communication signal amplified in the amplifier 1603 is transmitted to the second antenna circuit 105. The communication signal transmitted to the second antenna circuit 105 is transmitted to the third antenna circuit 110 as a radio signal 1605. The radio signal 1605 is received at the third antenna circuit 110 and transmitted to the signal processing circuit 1303. Moreover, the radio signal 1605 received at the third antenna circuit 110 is input to the power supply circuit 1311 through the rectifier circuit 1310 to acquire power supply for the signal processing circuit 1303.

The communication signal processed in the signal processing circuit 1303 shown in FIG. 16 is transmitted as the radio signal 1605 from the third antenna circuit 110 to the second antenna circuit 105. The second antenna circuit 105 transmits the radio signal 1605 received as a communication signal to the amplifier 1604 to amplify the communication signal. Then, the communication signal is transmitted to the reader/writer from the first antenna circuit 103 through the switch 1602.

Note that electricity is supplied to the signal processing circuit 1303 in FIG. 16 as follows: the communication signal is amplified by the amplifier 1603 with electricity supplied from the battery portion 104 in the power transmitter and receiver portion 101 so that the communication signal is transmitted as a radio signal to the third antenna circuit 110 through the second antenna circuit 105; then, the radio signal is rectified and smoothed in the rectifier circuit 1303 and made a constant voltage in the power supply circuit 1311 to be supplied to the signal processing circuit 1303.

Note that a reference clock signal is required in order to process the signals in the signal processing circuit 1303. For example, the carrier of the radio signals may be used for the clock signal. Alternatively, a clock generation circuit may be provided in the load portion 102 to acquire electricity supplied from the power supply circuit 1311 so that clock signals are stably supplied to the signal processing circuit 1303.

In this embodiment mode, for illustrative purposes, the communication signal is described as a signal which transports data between the reader/writer and the signal processing circuit, and the radio signal is described as a signal among the above-described communication signals which are transmitted and received between the second antenna circuit and the third antenna circuit.

Moreover, other than the structure shown in FIG. 16, a structure may be employed in which the frequency of the communication signals received at the first antenna circuit differs from the frequency of the radio signals transmitted from the second antenna circuit to the third antenna circuit. The structure will be specifically described with reference to FIG. 17.

Figure 17:
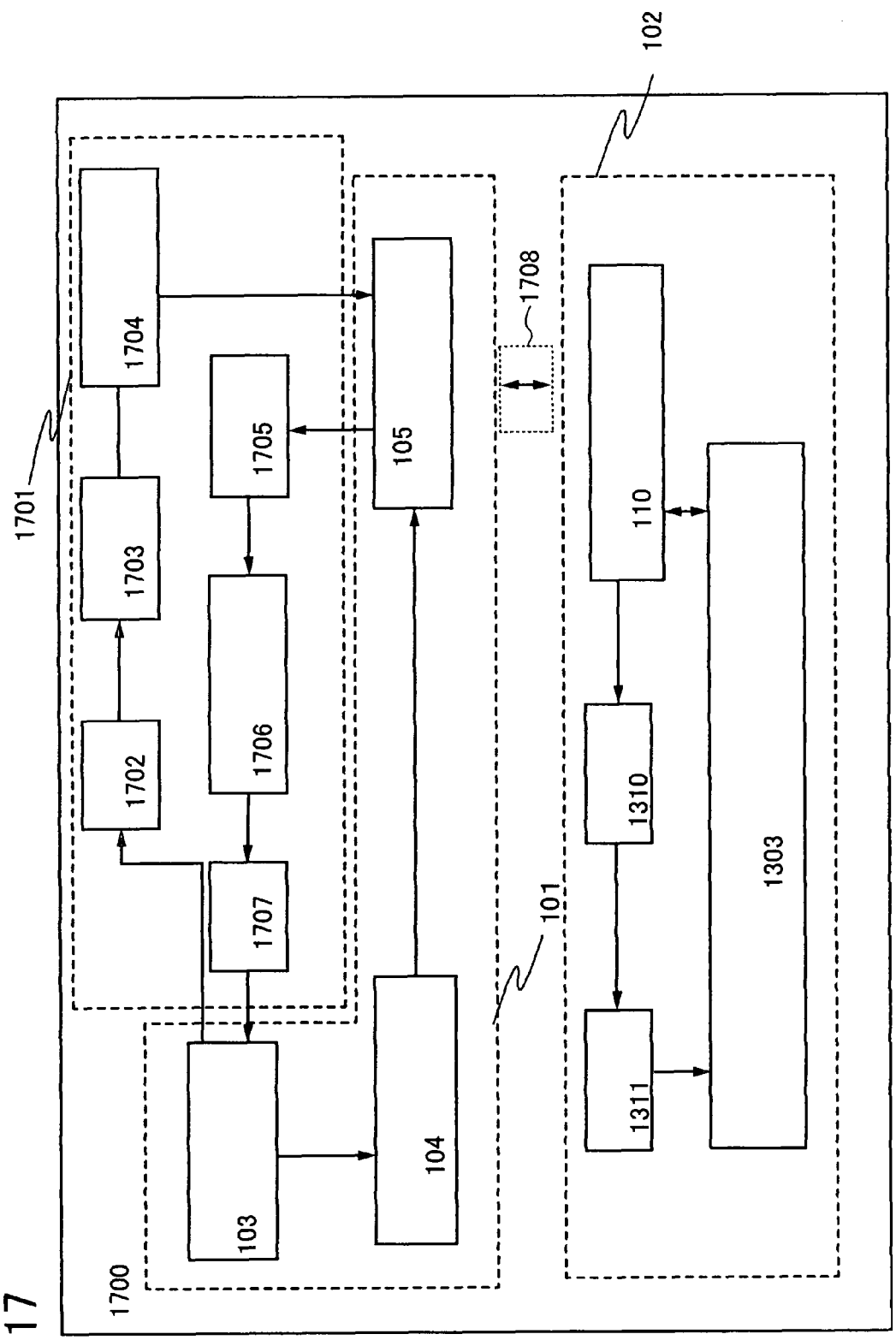
FIG. 17 is a diagram showing a structure of Embodiment Mode 3.

A wireless power receiving device 1700 shown in FIG. 17 includes the power transmitter and receiver portion 101, the load portion 102, and a signal transmitter/receiver portion 1701. The power transmitter and receiver portion 101 includes the first antenna circuit 103, the battery portion 104, and the second antenna circuit 105. In addition, the load portion 102 includes the signal processing circuit 1303, the rectifier circuit 1310, and the power supply circuit 1311. Further, the signal processing circuit 1303 includes the demodulation circuit, the logic circuit, the memory control circuit, the memory circuit, and the modulation circuit shown in FIG. 13. Furthermore, the signal transmitter and receiver portion 1701 includes a switch 1702, a demodulation circuit 1703, a frequency conversion circuit 1704, a demodulation circuit 1705, a frequency conversion circuit 1706, and a switch 1707.

Note that the structures of the first antenna circuit 103, the battery portion 104, the second antenna circuit 105, and the third antenna circuit 110 are the same as those described in Embodiment Mode 2. The difference of the structure from the structure shown in FIG. 13 in Embodiment Mode 2 is that the wireless power receiving device 1600 includes the signal transmitter and receiver portion 1701 and that the signal processing circuit 1303 in the load portion 102 is not connected to the fourth antenna circuit.

In the signal transmitter and receiver portion 1701, a communication signal transmitted from a reader/writer and received at the first antenna circuit 103 is input to the switch 1702 included in the signal transmitter and receiver portion 1701. Typically, communication signals are transmitted through a process such as ASK (amplitude shift keying) modulation or FSK (frequency shift keying) modulation of carriers of 13.56 MHz, 915 MHz, or the like. Note that on and off of the switch 1702 in the signal transmitter and receiver portion may be controlled as follows: for example, the switch 1702 operates in conjunction with the switch 402 in the charging control circuit 107 included in the battery portion 104 as shown in Embodiment Mode 1 such that the switch 1702 is turned off when the switch 402 is turned on, whereas the switch 1702 is turned on when the switch 402 is turned off. That is, transmission and reception of the communication signals to and from the first antenna circuit and charging of the battery are switched alternately.

In FIG. 17, the modulated communication signal received at the first antenna circuit 103 is demodulated in the demodulation circuit 1703. The signal demodulated in the demodulation circuit 1703 is transmitted to the frequency conversion circuit 1704. The frequency conversion circuit 1704 converts the signal to a communication signal having different frequency from that of a communication signal received at the first antenna circuit 103. The communication signal output from the frequency conversion circuit 1704 is transmitted as a radio signal 1708 to the third antenna circuit 110. The radio signal 1708 is received at the third antenna circuit 110 and transmitted to the signal processing circuit 1303. Moreover, the radio signal 1708 received at the third antenna circuit 110 is input to the power supply circuit 1311 through the rectifier circuit 1310 to acquire the power supply for the signal processing circuit 1303.

The communication signal processed in the signal processing circuit 1303 shown in FIG. 17 is transmitted as the radio signal 1708 from the third antenna circuit 110 to the second antenna circuit 105. The second antenna circuit 105 transmits the radio signal 1708 received to the demodulation circuit 1705 to demodulate the radio signal 1708 into a communication signal. The communication signal demodulated in the demodulation circuit 1705 is transmitted to the frequency conversion circuit 1706 to be converted to a communication signal having frequency different from that of the signal received at the second antenna circuit 105. The communication signal output from the frequency conversion circuit 1706 is transmitted from the first antenna circuit 103 to the reader/writer through the switch 1707.

Figure 18:
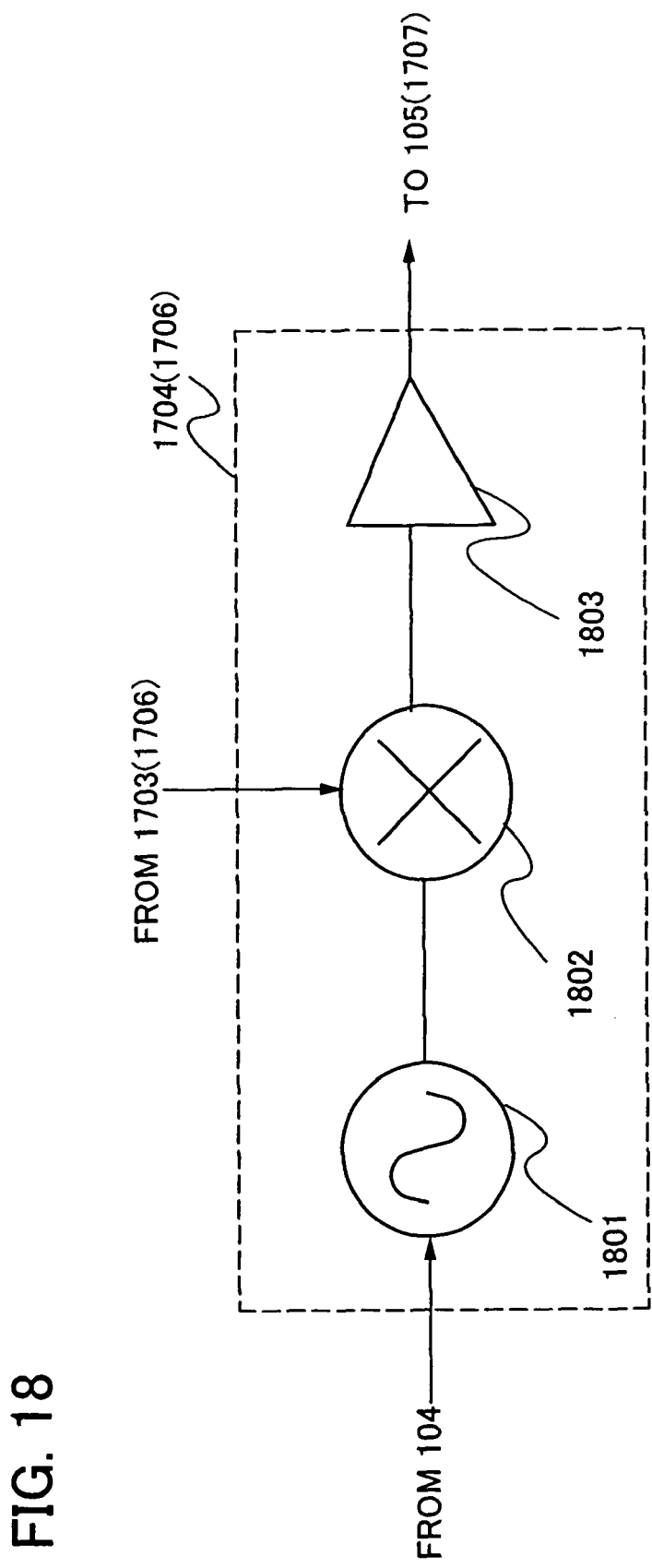
FIG. 18 is a diagram showing a structure of Embodiment Mode 3.

The structures of the frequency conversion circuits 1704 and 1706 shown in FIG. 17 will be specifically described. The frequency conversion circuit may be any circuit as long as it can convert the frequency of the communication signals input to the frequency conversion circuit. In FIG. 18, the frequency conversion circuits 1704 and 1706 each includes an oscillator 1801, a mixer 1802, and an amplifier 1803. The oscillator 1801 is supplied with electricity from the battery portion 104 and outputs a signal with desired frequency to the mixer 1802. The mixer 1802 multiplies the signal from the oscillator by the communication signal from the demodulation circuit 1703 (or 1705) and outputs the multiplied signals to the amplifier 1803. The amplifier 1803 amplifies the amplitude of the signal input from the mixer 1802 and outputs that signal to the second antenna circuit (or the switch 1707).

Note that electricity is supplied to the signal processing circuit 1303 in FIG. 17 as follows: the communication signal is amplified by the amplifier 1803 in the frequency conversion circuit 1704 with the electricity supplied from the battery 104 in the power transmitter and receiver portion 101 so that the communication signal is transmitted as a radio signal through the second antenna circuit 105 to the third antenna circuit 110; then, the radio signal is rectified and smoothed in the rectifier circuit 1303 and made a constant voltage in the power supply circuit 1311 to be supplied to the signal processing circuit 1303.

Note that a reference clock signal is required to process signals in the signal processing circuit 1303. For example, the carrier of the radio signals may be used for clock signals. Alternatively, a clock generation circuit may be provided in the load portion 102 to acquire power supply from the power supply circuit 1311 so that clock signals are stably supplied to the signal processing circuit 1303.

Note that the structure of the wireless power receiving device in this embodiment mode may be combined with the structure of the wireless power receiving device in the other embodiment modes in this specification. That is, as described in Embodiment Mode 1, the antennas in the first antenna circuit 103, the second antenna circuit 105, and the third antenna circuit 110 may be formed to have different shapes. In other words, each of the first radio (wireless) signal received at the first antenna circuit 103 and the second radio (wireless) signal transmitted and received between the second antenna circuit 105 and the third antenna circuit 110 may employ different types of power transmission methods using radio signals with different frequencies. By forming the power transmitter and receiver portion 101 and the load portion 102 separately, in the wireless power receiving device of the invention, the power transmitter and receiver portion and the load portion may be easily removed if desired. Accordingly, every time the frequency of the electromagnetic waves received at the first antenna circuit changes, the shape of the antenna may be adjusted by merely changing the power transmitter and receiver portion having the first antenna circuit. Therefore, the wireless power receiving device of the invention may be produced at low cost by reducing production cost for replacement of the first antenna.

Moreover, in the wireless power receiving device of this embodiment mode, the battery portion including the battery which accumulates electricity supplied through the first radio signal and the antenna which receives the first radio signal, and the load portion including the load supplied with electricity are formed separately so that the load portion is supplied with electricity through the second radio signal transmitted and received between the second antenna circuit and the third antenna circuit. Therefore, electricity may be transmitted from the battery portion which accumulates electricity supplied through the first radio signal, to the load portion supplied with electricity without using a penetration electrode or a wire bonding or the like. Accordingly, defects such as disconnection or poor connection may be reduced.

Embodiment Mode 4

In this embodiment mode, examples of usage patterns of the wireless power receiving device shown in the foregoing embodiment modes will be described with reference to FIGS. 14A to 15F.

Figure 14A:
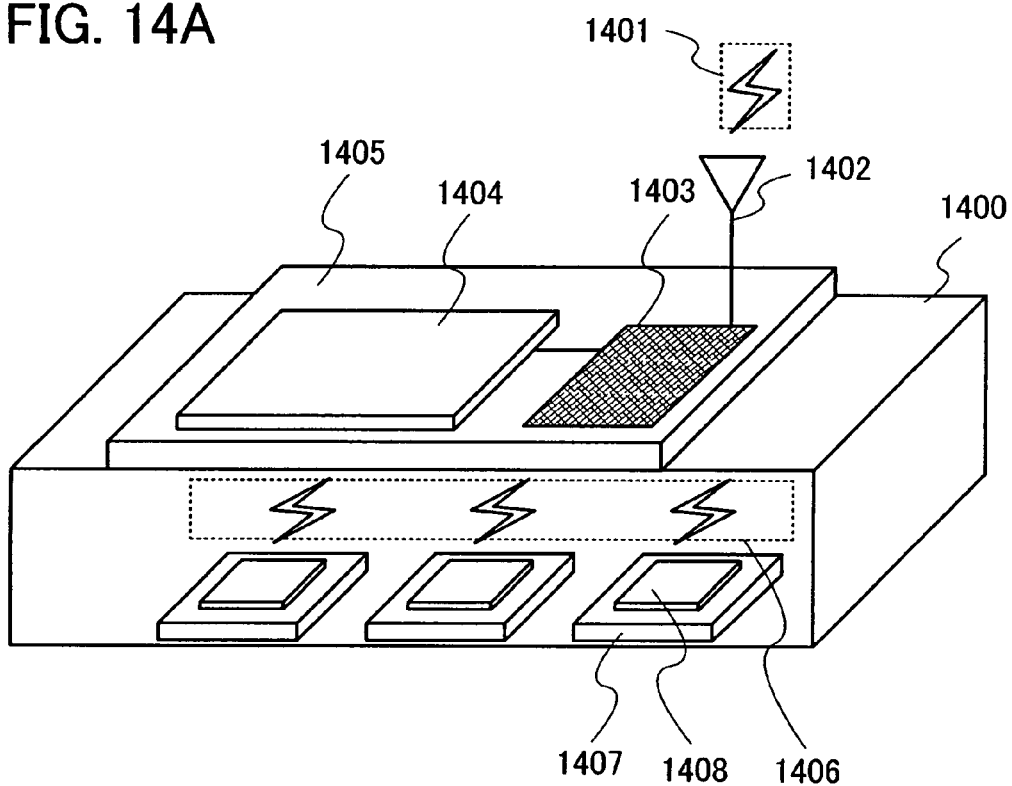
FIGS. 14A and 14B are diagrams showing structures of Embodiment Mode 4.

As a wireless power receiving device 1400 of the invention, FIG. 14A illustrates the positional relationship between a power transmitter and receiver portion 1405 including a first antenna circuit 1402 which receives a first radio signal 1401, a battery portion 1403, and a second antenna circuit 1404, and a load portion 1407 including a third antenna circuit 1408 which receives a second radio signal 1406.

Figure 14B:
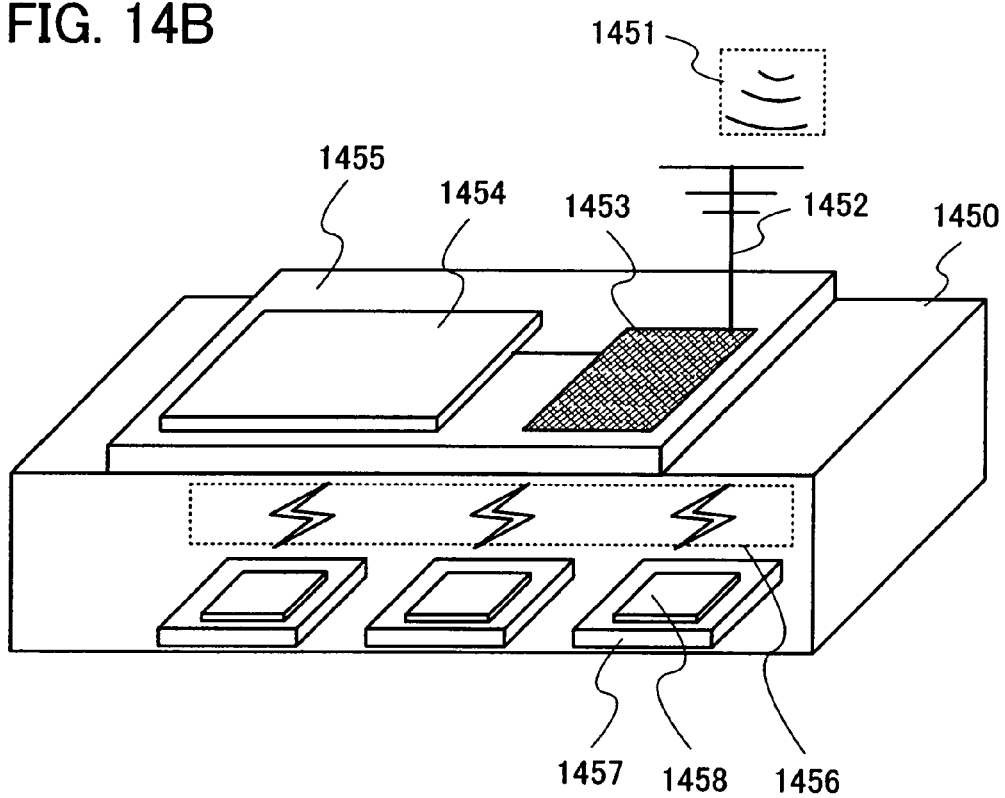

Moreover, as a wireless power receiving device 1450 of the invention, FIG. 14B illustrates the positional relationship between a power transmitter and receiver portion 1455 including a first antenna circuit 1452 which receives a first radio signal 1451, a battery portion 1453, and a second antenna circuit 1454, and a load portion 1457 including a third antenna circuit 1458 which receives a second radio signal 1456.

In FIGS. 14A and 14B, power transmission methods of the first radio (wireless) signal 1401 in FIG. 14A and the first radio signal 1451 in FIG. 14B are different from each other. Therefore, the forms of antennas of the first antenna circuit 1402 in FIG. 14A and the first antenna circuit 1452 in FIG. 14B should be changed to have different shapes. In the wireless power receiving device of the invention, the power transmitter and receiver portion and the load portion may be formed separately because electricity is supplied from the power transmitter and receiver portion to the load portion by using the second radio signals. Therefore, in the case where a power transmission method of the first radio signal received at the first antenna circuit is changed, only the design of the power transmitter and receiver portion should be changed so that cost may be substantially reduced.

Further, in the case where the power transmitter and receiver portion and the load portion are different in sizes, the power transmitter portion and the load portion are preferably formed separately though FIGS. 14A and 14B do not illustrate that case. However, in the case where the power transmitter and receiver portion and the load portion are physically connected by using penetration electrodes, wire bonding, or the like after the power transmitter and receiver portion and the load portion are separately formed, disconnection or poor connection may be a concern. In the present invention, power transmission and reception between the power transmitter and receiver portion and the load portion are performed by using the second radio signal without physical connecting methods such as penetration electrodes, wire bonding, and the like so that problems like disconnection and poor connection may be reduced. In addition, the power transmission and reception portion and the load portion may be formed separately. Therefore, in the case where the power transmission and reception portion and the load portion are different in sizes, they may be formed separately.

Note that the power transmitter and receiver portion may include a plurality of load portions in the present invention as shown in FIGS. 14A and 14B. In the present invention, the structure including a plurality of a load portions can also perform power supply without physical connection such as penetration electrodes, wire bonding, or the like. Therefore, it is particularly preferable to employ the structure including a plurality of a load portions because feeding with complicated wirings due to a plurality of physical connections such as penetration electrodes, wire bonding, or the like is not required. A specific use of the structure includes the power supply and the like for a plurality of electronic devices and electronic components under circumstances where the power supply by electric wires is difficult. In other words, in the present invention, the battery is charged when the first antenna circuit receives commercial radio waves from a long distance so that electricity is intermittently supplied at close range between the second antenna circuit and the third antenna circuit under circumstances where the power supply by electric wires is difficult.

For example, electronic devices having the wireless power receiving device of the invention include cell phones, digital video cameras, computers, personal digital assistants (mobile computers, cell phones, portable game machines, electronic books, and the like), image reproduction devices with a recording medium (specifically, a device including a display which is capable of reproducing a memory medium such as a digital versatile disc (DVD) and displaying images therein), and the like. Examples of such electronic devices will be described below with reference to FIGS. 15A to 15F.

Figure 15A:
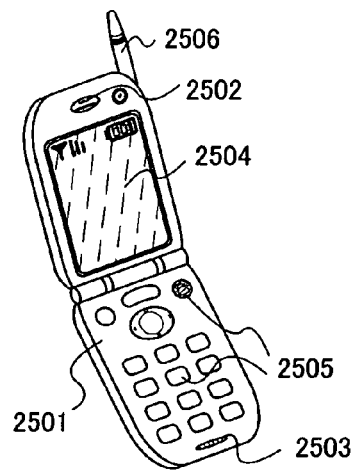
FIGS. 15A to 15F are diagrams showing structures of Embodiment Mode 4.

FIG. 15A illustrates one example of a cell phone including a main body 2501, an audio output portion 2502, an audio input portion 2503, a display portion 2504, operating switches 2505, an antenna 2506, and the like. The wireless power receiving device of the present invention corresponds to the main body 2501, the first antenna circuit to the antenna 2506, and the load portion to the electronic components such as the audio output portion 2502, the audio input portion 2503, the display portion 2504, and the operating switches 2505. In addition, the main body 2501 includes the battery portion connected to the second antenna circuit. The third antenna circuit is provided to any one of the electronic components such as the audio output portion 2502, the audio input portion 2503, the display portion 2504, and the operating switches 2505. The antenna 2506 receives radio signals from the outside to charge the battery so that the second antenna circuit connected to the battery can supply electricity by using the radio signals through the third antenna circuit to each electronic component which consumes electricity.

Figure 15B:
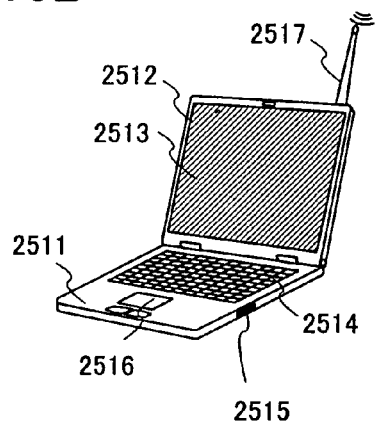

FIG. 15B illustrates one example of a portable computer (also referred to as a notebook computer) having a main body 2511, a housing 2512, a display portion 2513, a keyboard 2514, an external connection port 2515, a pointing device 2516, an antenna 2517, and the like. The wireless power receiving device of the invention corresponds to the main body 2511, the first antenna circuit to the antenna 2517, the load portion to the electronic components such as the display portion 2513, the keyboard 2514, the external connection port 2515, and the pointing device 2516. In addition, the main body 2511 includes the battery portion connected to the second antenna circuit. The third antenna circuit is provided to any one of the electronic components such as the display portion 2513, the keyboard 2514, the external connection port 2515, and the pointing device 2516. The antenna 2517 receives radio signals from outside to charge the battery so that the second antenna circuit connected to the battery can supply electricity by using the radio signals through the third antenna circuit to each electronic component which consumes electricity.

Figure 15C:
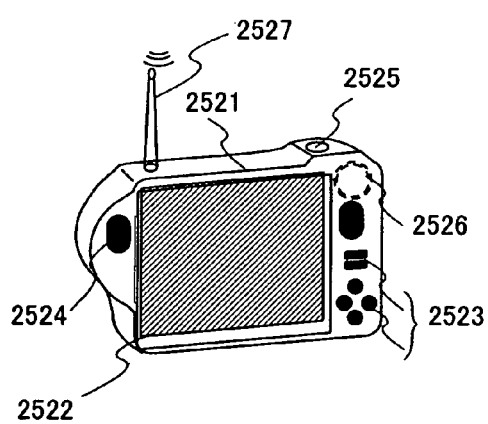

FIG. 15C illustrates one example of a digital camera having a main body 2521, a display portion 2522, operation keys 2523, a speaker 2524, a shutter button 2525, an image receiving portion 2526, an antenna 2527, and the like. The wireless power receiving device of the invention corresponds to the main body 2521, the first antenna circuit to the antenna 2527, the load portion to the electronic components such as the display portion 2522, the operation keys 2523, the speaker 2524, the shutter button 2525, and the image receiving portion 2526. In addition, the main body 2521 includes the battery portion connected to the second antenna circuit. The third antenna circuit is provided to any one of the electronic components such as the display portion 2522, the operation keys 2523, the speaker 2524, the shutter button 2525, and the image receiving portion 2526. The antenna 2527 receives radio signals from outside to charge the battery so that the second antenna circuit connected to the battery can supply electricity by using the radio signals through the third antenna circuit to each electronic component which consumes electricity.

Figure 15D:
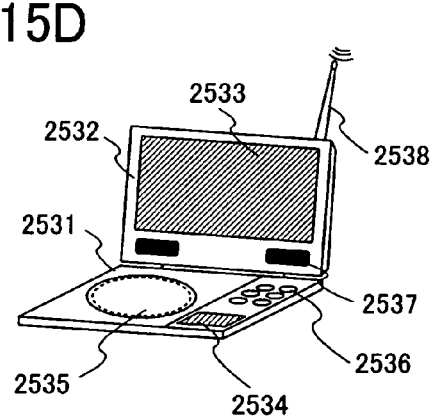

FIG. 15D illustrates one example of a portable image reproduction device (such as a DVD player) provided with a recording medium, having a main body 2531, a housing 2532, a first display portion 2533, a second display portion 2534, a recording medium (DVD and the like) reading portion 2535, operation keys 2536, a speaker portion 2537, an antenna 2538, and the like. The wireless power receiving device of the invention corresponds to the main body 2531, the first antenna circuit to the antenna 2538, the load portion to the electronic components such as the first display portion 2533, the second display portion 2534, the recording medium (DVD and the like) reading portion 2535, the operation keys 2536, and the speaker 2537. In addition, the main body 2531 includes the battery portion connected to the second antenna circuit. The third antenna circuit is provided to any one of the electronic components such as the first display portion 2533, the second display portion 2534, the recording medium (DVD and the like) reading portion 2535, the operation keys 2536, and the speaker 2537. The antenna 2538 receives radio signals from outside to charge the battery so that the second antenna circuit connected to the battery can supply electricity by using the radio signals through the third antenna circuit to each electronic component which consumes electricity.

Figure 15E:
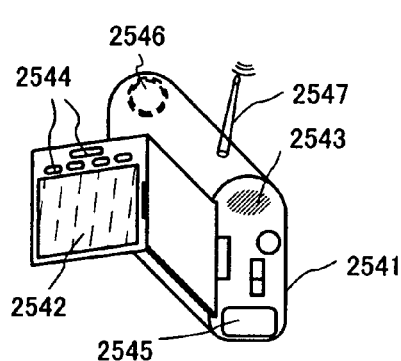

FIG. 15E illustrates one example of a digital video camera having a main body 2541, a display portion 2542, a audio input portion 2543, operation switches 2544, a battery 2545, an image receiving portion 2546, an antenna 2547 and the like. The wireless power receiving device of the invention corresponds to the main body 2541, the first antenna circuit to the antenna 2547, the load portion to the electronic components such as the display portion 2542, the audio input portion 2543, the operation switches 2544, the battery 2545, and the image receiving portion 2546. In addition, the main body 2541 includes the battery portion connected to the second antenna circuit. The third antenna circuit is provided to any one of the electronic components such as the display portion 2542, the audio input portion 2543, the operation switches 2544, the battery 2545, and the image receiving portion 2546. The antenna 2547 receives radio signals from outside to charge the battery so that the second antenna circuit connected to the battery can supply electricity by using the radio signals through the third antenna circuit to each electronic component which consumes electricity.

Figure 15F:
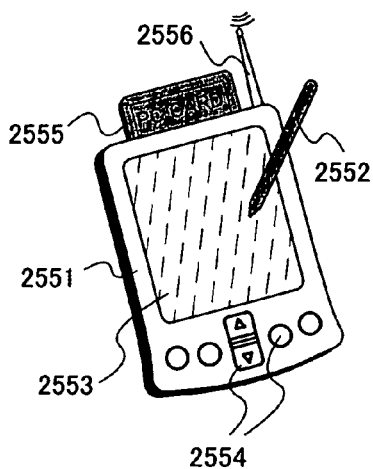

FIG. 15F illustrates one example of a personal digital assistant including a main body 2551, a stylus 2552, a display portion 2553, operation buttons 2554, an external interface 2555, antenna 2556, and the like. The wireless power receiving device of the invention corresponds to the main body 2551, the first antenna circuit to the antenna 2556, the load portion to the electronic components such as the display portion 2553, the operation buttons 2554, and the external interface 2555. In addition, the main body 2551 includes the battery portion connected to the second antenna circuit. The third antenna circuit is provided to any one of the electronic components such as the display portion 2553, the operating buttons 2554, and the external interface 2555. The antenna 2556 receives radio signals from outside to charge the battery so that the second antenna circuit connected to the battery can supply electricity by using the radio signals through the third antenna circuit to each electronic component which consumes electricity.

Note that the structure of the wireless power receiving device in this embodiment mode may be combined with the structure of the wireless power receiving device in the other embodiment modes in this specification. Therefore, as described in foregoing Embodiment Mode 1, each antenna of the first antenna circuit 103, the second antenna circuit 105, and the third antenna circuit 110 may have a different shape. In other words, each of the first radio (wireless) signal received at the first antenna circuit 103 and the second radio (wireless) signal transmitted and received between the second antenna circuit and the third antenna circuit may employ different types of power transmission methods using radio signals with different frequencies. In the wireless power receiving device of the invention, by forming the antenna and the battery as the power transmitter and receiver portion and the electronic components as the load portion separately, the power transmitter and receiver portion and the load portion may be easily removed if desired. Accordingly, every time the frequency of the electromagnetic waves received at the first antenna circuit changes, the shape of the antenna may be adjusted by merely changing the power transmitter and receiver portion having the first antenna circuit. Therefore, the wireless power receiving device of the invention may be produced at low cost by reducing production cost for replacing the first antenna.

Moreover, in the present invention, the battery portion including the battery which accumulates electricity supplied through the first radio signal and the antenna which receives the first radio signal, and the load portion including the load supplied with electricity are formed separately so that the load portion is supplied with electricity through the radio signals. Therefore, electricity may be transmitted from the battery portion which accumulates electricity supplied through the first radio signal, to the load portion supplied with electricity without using a penetration electrode or a wire bonding or the like. Accordingly, defects such as disconnection or poor connection may be reduced.

This application is based on Japanese Patent Application serial no. 2006-312680 filed in Japan Patent Office on 20 Nov. 2006, the entire contents of which are hereby incorporated by reference.

What is claimed is:

1. A wireless power receiving device comprising:
 a power transmitter and receiver portion including:
  a first antenna circuit configured to receive a first wireless signal wirelessly;
  a battery portion configured to be charged with electricity generated upon reception of the first wireless signal at the first antenna circuit, and
  a second antenna circuit configured to transmit electricity stored in the battery portion as a second wireless signal, and
 a load portion including:
  a third antenna circuit configured to receive the second wireless signal, and
  a load configured to be supplied with the second wireless signal received at the third antenna circuit.

2. A wireless power receiving device according to claim 1, wherein the battery portion includes a rectifier circuit, a charging control circuit, a battery, and a discharging control circuit,
 wherein the charging control circuit is configured to control charging of the battery with electricity generated upon input of the first wireless signal to the rectifier circuit, and
 wherein the discharging control circuit is configured to control discharging of the electricity stored in the battery into the second antenna circuit.

3. A wireless power receiving device according to claim 1, wherein antennas of the first antenna circuit and the second antenna circuit are different in shape.

4. A wireless power receiving device according to claim 1, wherein the battery portion comprises one of a secondary battery and a capacitor.

5. A wireless power receiving device according to claim 1, wherein the battery portion is one of a lithium battery, a lithium polymer battery, a lithium ion battery, a nickel metal hydride battery, a nickel cadmium battery, an organic radical battery, a lead-acid battery, an air secondary battery, a nickel-zinc battery, a silver-zinc battery, and an electric double layer capacitor.

6. A wireless power receiving device according to claim 1, wherein the first wireless signal is a commercial radio wave in exterior space.

7. A wireless power receiving device according to claim 1, wherein the first wireless signal is an electromagnetic wave transmitted from a feeder.

8. A wireless power receiving device according to claim 1, wherein the second antenna circuit is configured to transmit the second wireless signal to the third antenna circuit by one of an electromagnetic coupling method and an electromagnetic induction method.

9. A wireless power receiving device according to claim 1, wherein the first antenna circuit includes a plurality of antennas, and
 wherein the plurality of the antennas are different from each other in shape.

10. A wireless power receiving device according to claim 1, wherein the second antenna circuit includes an amplifier configured to amplify an amplitude of the second wireless signal by using electricity supplied from the battery portion.

11. A wireless power receiving device according to claim 1, wherein the second antenna circuit includes an oscillator configured to control a frequency of the second wireless signal.

12. A wireless power receiving device according to claim 1, wherein the load is an RF tag including a rectifier circuit, a power supply circuit, a signal processing circuit, and a fourth antenna circuit,
 wherein a signal received at the fourth antenna circuit is processed by the signal processing circuit, and
 wherein electricity for driving the signal processing circuit is generated from the second wireless signal input from the third antenna circuit to the power supply circuit through the rectifier circuit.

13. A wireless power receiving device according to claim 1, wherein the load portion includes a load connected to the third antenna circuit, and
 wherein the load is an electronic device configured to be driven with intermittent power supply.

14. A wireless power receiving device comprising:
  a power transmitter and receiver portion including:
    a first antenna circuit configured to receive a communication signal wirelessly;
    a battery portion configured to be charged with electricity generated upon reception of the communication signal at the first antenna circuit;
    a signal transmitter and receiver portion configured to amplify an amplitude of the communication signal by using the electricity stored in the battery portion; and
    a second antenna circuit configured to transmit the communication signal amplified by the signal transmitter and receiver portion as a wireless signal, and
  a load portion including:
    a third antenna circuit configured to receive the wireless signal;
    a rectifier circuit configured to be supplied with the wireless signal received at the third antenna circuit;
    a power supply circuit configured to generate electricity by using an output signal from the rectifier circuit; and
    a signal processing circuit configured to be supplied with the wireless signal received at the third antenna circuit and the electricity from the power supply circuit.

15. A wireless power receiving device according to claim 14,
  wherein the battery portion includes a rectifier circuit, a charging control circuit, a battery, and a discharging control circuit,
  wherein the charging control circuit is configured to control charging of the battery with electricity generated upon input of the communication signal to the rectifier circuit, and
  wherein the discharging control circuit is configured to control discharging of the electricity stored in the battery.

16. A wireless power receiving device according to claim 14, wherein antennas of the first antenna circuit and the second antenna circuit are different in shape.

17. A wireless power receiving device according to claim 14, wherein the signal transmitter and receiver portion includes a switch configured to control input or output of the communication signal to or from the signal transmitter and receiver portion, and an amplifier configured to amplify an amplitude of the communication signal.

18. A wireless power receiving device according to claim 14, wherein the battery portion comprises a secondary battery or a capacitor.

19. A wireless power receiving device according to claim 14, wherein the battery portion comprises one of a lithium battery, a lithium polymer battery, a lithium ion battery, a nickel metal hydride battery, a nickel cadmium battery, an organic radical battery, a lead-acid battery, an air secondary battery, a nickel-zinc battery, a silver-zinc battery, and an electric double layer capacitor.

20. A wireless power receiving device according to claim 14, wherein the communication signal is a signal transmitted from a reader/writer.

21. A wireless power receiving device according to claim 14, wherein the second antenna circuit is configured to transmit the wireless signal to the third antenna circuit by using one of an electromagnetic coupling method and an electromagnetic induction method.

22. A wireless power receiving device according to claim 14, wherein the first antenna circuit includes a plurality of antennas, and wherein the plurality of the antennas are different from each other in shape.

23. A wireless power receiving device comprising:
  a power transmitter and receiver portion comprising a battery portion and configured to receive a first wireless signal wirelessly for charging the battery portion with electricity of the first wireless signal; and
  a plurality of electronic devices, each of the electronic devices provided adjacent to the power transmitter and receiver portion and configured to receive a second wireless signal wirelessly from the battery portion to supply an electricity to be consumed in the each of the electronic devices.

24. A wireless power receiving device according to claim 23 wherein each of the electronic devices is selected from the group consisting of a cell phone, a computer, a digital camera, an image reproduction device provided with a recording medium, a digital video camera, and a personal digital assistant.

25. A wireless power receiving device according to claim 23, wherein the battery portion comprises one of a secondary battery and a capacitor.

26. A wireless power receiving device according to claim 23, wherein the first wireless signal is a commercial radio wave in exterior space.

27. A wireless power receiving device according to claim 23, wherein the first wireless signal is an electromagnetic wave transmitted from a feeder.

28. A wireless power receiving device according to claim 23, wherein the battery portion comprises one of a lithium battery, a lithium polymer battery, a lithium ion battery, a nickel metal hydride battery, a nickel cadmium battery, an organic radical battery, a lead-acid battery, an air secondary battery, a nickel-zinc battery, a silver-zinc battery, and an electric double layer capacitor.

29. A cell phone comprising:
  a body comprising a battery portion and configured to receive a first wireless signal wirelessly for charging the battery portion with electricity of the first wireless signal;
  an audio output portion;
  an audio input portion;
  a display portion; and
  an operating switch,
  wherein at least one of the audio output portion, the audio input portion, the display portion, and the operating switch is provided adjacent to the body and configured to receive a second wireless signal wirelessly from the battery portion to supply an electricity to be consumed in the at least one of the audio output portion, the audio input portion, the display portion, and the operating switch.

30. A cell phone according to claim 29, wherein the battery portion comprises one of a secondary battery and a capacitor.

31. A cell phone according to claim 29, wherein the first wireless signal is a commercial radio wave in exterior space.

32. A cell phone according to claim 29, wherein the first wireless signal is an electromagnetic wave transmitted from a feeder.

33. A cell phone according to claim 29, wherein the battery portion comprises one of a lithium battery, a lithium polymer battery, a lithium ion battery, a nickel metal hydride battery, a nickel cadmium battery, an organic radical battery, a lead-acid battery, an air secondary battery, a nickel-zinc battery, a silver-zinc battery, and an electric double layer capacitor.

* * * * *